(12) United States Patent
Murade

(10) Patent No.: US 7,277,150 B2
(45) Date of Patent: Oct. 2, 2007

(54) ELECTROOPTICAL DEVICE, METHOD OF MANUFACTURING SAME, AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 202 days.

(21) Appl. No.: 10/830,087

(22) Filed: Apr. 23, 2004

(65) Prior Publication Data

US 2004/0252269 A1 Dec. 16, 2004

(30) Foreign Application Priority Data

May 2, 2003 (JP) ............... 2003-127315
Feb. 20, 2004 (JP) ............... 2004-044660

(51) Int. Cl.
*G02F 1/1345* (2006.01)
(52) U.S. Cl. ............ 349/149; 349/152; 349/38; 349/39
(58) Field of Classification Search ............... 349/139, 349/149, 152, 38, 39
See application file for complete search history.

(56) References Cited

U.S. PATENT DOCUMENTS

| | | |
|---|---|---|
| 6,433,767 B1 | 8/2002 | Murade |
| 6,433,841 B1 | 8/2002 | Murade et al. |
| 6,528,822 B2 | 3/2003 | Murade |
| 6,611,301 B2 | 8/2003 | Murade et al. |
| 6,627,485 B2 | 9/2003 | Murade |
| 6,703,997 B2 | 3/2004 | Murade |
| 6,897,932 B2 | 5/2005 | Murade et al. |
| 6,979,839 B2 * | 12/2005 | Murade ............ 257/59 |
| 2003/0076460 A1 * | 4/2003 | Murade ............ 349/111 |

FOREIGN PATENT DOCUMENTS

| | | |
|---|---|---|
| CN | 1319832 A | 10/2001 |
| JP | A 11-072804 | 3/1999 |
| JP | A 2000-206568 | 7/2000 |
| JP | A 2001-305580 | 10/2001 |
| JP | A 2001-330857 | 11/2001 |
| JP | A 2001-343913 | 12/2001 |
| JP | A 2002-236459 | 8/2002 |
| JP | A 2003-066113 | 3/2003 |
| JP | A 2003-121875 | 4/2003 |
| KR | 1999-0068231 | 8/1999 |

* cited by examiner

*Primary Examiner*—David Nelms
*Assistant Examiner*—(Nancy) Thanh-Nhan P Nguyen
(74) *Attorney, Agent, or Firm*—Oliff & Berridge, PLC

(57) ABSTRACT

The invention provides an electro-optical device with a connection terminal unit that can include a first insulating film formed over a substrate and planarized, a first conductive film formed over the first insulating film and transmitting a signal from an external circuit. The connection terminal unit can also include a second insulating film formed over the first insulating film and planarized and an opening formed in an area of the second insulating film that corresponds to the first insulating film and extending to the first conductive film.

22 Claims, 22 Drawing Sheets

ELECTROOPTICAL DEVICE, METHOD OF MANUFACTURING SAME, AND ELECTRONIC APPARATUS

BACKGROUND OF THE INVENTION

1. Field of Invention

The present invention relates to a technical field of electro-optical devices, such as an active matrix driven liquid crystal device, an electrophoresis apparatus like an electronic paper, and an EL (Electro-Luminescence) display, and a method of manufacturing the same. The invention also relates to a technical field of an electronic apparatus including such an electro-optical device.

2. Description of Related Art

Conventionally, an electro-optical device capable of so-called active matrix driven has been known. The active matrix driven electro-optical device includes, on a substrate, pixel electrodes arranged in a matrix, thin film transistors (TFT) connected to each of pixel electrodes, and also includes data lines and scanning lines that are connected to each of TFTs and provided parallel to a row direction and column direction, respectively, so as to be driven by an active matrix method. Such an electro-optical device can also include counter electrodes opposed to the pixel electrodes, a liquid crystal layer interposed between the pixel electrodes and counter electrodes, and alignment films formed over each of pixel electrodes and counter electrodes, so as to enable image display.

The orientation state of liquid crystal molecules in the liquid crystal layer that have been set to a given orientation state by the alignment film, is appropriately changed depending on a given potential difference between the pixel electrodes and counter electrodes. Thus, transmittance for light transmitting in the liquid crystal layer varies, enabling images to be displayed.

In this case, the alignment film plays a large role in keeping the liquid crystal molecules to which electric field is not applied, in a given orientation state. In order to realize this, a method where the alignment film is composed of a polymer organic compound, such as polyimide, and rubbing for the alignment film is implemented has been widely adopted. The rubbign is a treatment where a surface of the alignment film after annealed is unidirectionally rubbed with a buff cloth rolled around a rotating metal roller. This allows principal chains of polymer to be extended along a given direction such that the liquid crystal molecules are aligned along the extending direction.

In addition, the substrate of the electro-optical device can include an image display area where scanning lines, data lines, and pixel electrodes are provided, and a peripheral area where a driver for scanning lines, a driver for data lines, and connection terminals for external circuit for supplying given signals to these drivers are provided.

SUMMARY OF THE INVENTION

The conventional electro-optical device, however, involves the following problems. First, scanning lines, data lines, pixel electrodes, and TFTs are formed on a substrate in a manner of forming a stack structure. For example, TFTs, scanning lines, data lines, and pixel electrodes are vertically stacked in this order from a surface side of the substrate while interposing interlayer insulating films therebetween so as to form the stack structure. In such a structure, however, if the stack structure is different between an area where the TFTs are formed and the other area for example, an area with large layer thickness and an area with small one are formed. As a result, a step is caused at the top layer, and a step is also caused in an alignment film formed thereon, resulting in display unevenness. This display unevenness seems to be caused by rubbing unevenness. Namely, when rubbing is implemented for the alignment film, thread ends of a buff cloth is disturbed at the step. As a result, the degree of rubbing becomes uneven over a surface of the substrate such that liquid crystal molecules are not oriented in a certain direction. Incidentally, the display unevenness may be caused in a streak manner along the direction of the rubbing and degrade display quality.

Conventionally, therefore, a structure where a trench is formed in an area with large layer thickness by etching so as to adjust the extra thickness being superfluous in comparison with a thin area has been proposed. In such a structure, however, if there is a plurality of areas having different layer thickness for example, etching for adjusting each of the areas is required. The number of etching processes therefore needs to be increased such that the etching treatment needs to be implemented more than once. This plural treatment, however, is not practical since the process becomes complicated such that only a partial thickness adjustment has been implemented. Thus, in a conventional structure, even though one part, for example, a connection area is flat, the difference in level is caused for the whole substrate.

Furthermore, forming a trench by etching may cause underlayer remaining, which has been the cause of short-circuit between wiring.

Meanwhile, the conventional electro-optical device also involves the following problem. Namely, in the stack structure, the connection terminal for external circuit is a terminal for establishing electrical connection to a circuit provided in the external of the electro-optical device, such as a circuit for supplying given signals to a driver for data lines or driver for scanning lines, or a power source for supplying given potential to counter electrodes. Accordingly, the connection terminal for external circuit needs to include outwardly exposed part. In order to form a structure where the part under an interlayer insulating film is exposed to outside as premises for the stack structure, however, an opening needs to be formed in the interlayer insulating film for the part. According to this, a shape where an outermost surface of the stack structure sinks corresponding to the opening is formed, causing concavity and convexity in the outermost surface. If an alignment film is formed on such an outermost surface having irregularity, the concavity and convexity are transferred to the alignment film such that concavity and convexity are caused on the alignment film, too. As a result, when the alignment film is rubbed, the rotating roller suffers from irregular stress depending on locations. This increases the possibility for shaving the alignment film. If such shavings are generated so as to be left between the pixel electrodes and counter electrodes, the achievement of desired orientation state corresponding to potential difference between both electrodes may be prevented (namely, orientation defect may be caused). Thus, image quality may be deteriorated, for example, light pass can be caused.

The invention is intended to provide an electro-optical device and a method of manufacturing the same that enables displaying of higher quality imaging by eliminating the difference of layer thickness between areas to the utmost so as to eliminate a step on an alignment film, or by planarizing an area where connection terminals for external circuit are formed as completely as possible so as to suppress shavings of the alignment film caused during rubbing to the utmost.

In addition, the invention is also intended to provide an electronic apparatus including such an electro-optical device.

In order to solve the problem, a first electro-optical device of the invention can include a connection terminal unit having a first insulating film formed over a substrate and planarized and a first conductive film formed over the first insulating film and transmitting a signal from an external circuit. The connection terminal unit also comprises a second insulating film formed over the first insulating film and planarized and an opening formed in an area of the second insulating film that corresponds to the first conductive film and extending to the first conductive film.

According to the first electro-optical device of the invention, the first and second insulating films can be planarized by CMP (Chemical Mechanical Polishing) treatment for example. Thus, the surfaces thereof have superior planarity. The opening extending to the first conductive film is formed in the second insulating film, and thereby the connection terminal unit is formed. The total thickness of an area where wiring or an electrode exists is different from that of an area without them in the stack structure beneath the first insulating film. Accordingly, if the first insulating film is not planarized, in order to planarize at the second insulating film, which is an upper layer, the second insulating film needs to be deposited with large thickness and thereafter be planarized. Accordingly, in order to planarize at the second insulating film, which is an upper layer, the second insulating film needs to be deposited with large thickness and thereafter be planarized. According to the invention, however, the second insulating film may be deposited with small thickness and be planarized such that the difference in level in the connection terminal area can easily be reduced, enabling the reduction of cost. In addition, areas with different total thickness are reduced since superior planarity can be achieved. Furthermore, the situation where shavings are generated due to the concavity and convexity when rubbing is implemented for the alignment film can be avoided. As a result, higher quality images can be displayed in the present invention.

The first electro-optical device of one aspect of the invention can further include a switching element disposed in an image display area, a data line electrically connected to the switching element, and a pixel electrode electrically connected to the switching element. The first electro-optical device also can have a storage capacitor including a pixel-potential-side capacitor electrode electrically connected to pixel potential of the pixel electrode, and a fixed-potential-side capacitor electrode opposed to the pixel-potential-side capacitor electrode through an insulating film, and a capacitance line formed above the data line and electrically connected to the fixed-potential-side capacitor electrode. The capacitance line is formed over the first insulating film. The first conductive film is formed of the same film as that of the capacitance line.

According to this aspect, even if the difference in total thickness between an area where wiring or electrode exists and an area without them is increased due to the structure where stacked is each of elements such as a switching element, a data line, an electrode constituting a storage capacitor, and a capacitance line that are disposed in an image display area, the reduction of manufacturing cost and superior planarity can be achieved by planarizing the first and second insulating films.

In another aspect of the first electro-optical device of the invention, a conductive film formed of the same film as that of any of wiring and an electrode that is deposited in an image display area, is formed beneath the first insulating film that corresponds to the connection terminal unit.

According to this aspect, cost can be reduced, and the difference in total thickness between the stack structure of the connection terminal area and that of the image display area can be compensated since the wiring stacked in the image display area is utilized.

In another aspect of the first electro-optical device of the invention, the first conductive film may form a surface of the connection terminal unit connected to a substrate for connecting to the external circuit.

In another aspect of the first electro-optical device of the invention, a top surface of the second insulating film may be flush with a top surface of the first conductive film. In this aspect, the difference in level between the second insulating film and the first conductive film is not generated. Accordingly, the generation of shavings when rubbing is implemented for an alignment film can be avoided.

The first electro-optical device of another aspect of the invention may further include a second conductive film electrically connected to the first conducive film through the opening in the second insulating film. This aspect enables the second conductive film to have a function as a thickness controlling film for planarizing.

In this aspect, the second conductive film may be formed of the same film as that of the pixel electrode for example. In addition, the second conductive film may form a surface of the connection terminal unit connected to a substrate for connecting to the external circuit. In this aspect, the opening in the second insulating film may have a plurality of first contact holes, and the first and second conductive films may be electrically connected to each other through the first contact holes. The film thickness of the second insulating film can be small, and the depth of the first contact holes may be small since the first insulating film is planarized. Furthermore, the resistance of connection between the first and second conductive films is lowered since a plurality of contact holes is formed. In this aspect, the first contact holes may be formed in a manner of being dotted at least over the first conductive film.

According to this aspect, for example, as compared to the case where only one first contact hole having the same area as that of the conductive film is formed, the second conductive film does not drop down toward the bottom of the first contact holes. Accordingly, even if an alignment film is formed on the structure according to the aspect, namely on the second conductive film, concern that concavity and convexity are formed in a surface of the alignment film is further reduced, and areas having different layer thickness are reduced. In addition, the possibility that shavings of the alignment film are generated due to rubbing for the alignment film is extremely reduced. The first contact holes may be dotted over the whole conductive film evenly, or may be dotted in a line, lattice, or checked manner.

In another aspect of the first electro-optical device of the invention, the first conductive film may be electrically connected to wiring that is electrically connected to an internal circuit. In addition, the wiring electrically connected to the internal circuit may be formed over the first insulating film and be formed of the same film as that of the first conductive film. Otherwise, the wiring may be formed over a third insulating film that is under the first insulating film, and be electrically connected to the first conductive film through a second contact hole. In this aspect, the second contact hole may be formed under the periphery of the first conductive film.

According to this aspect, an area that is not a peripheral area of the first conductive film, namely the center area of the conductive film, is not formed above the second contact hole, superior planarity therefore can be achieved in the area. In this aspect, the second contact hole may be positioned at an area overlapping with the second insulating film. According to this structure, the planarity of the first conductive film is maintained.

The plurality of second contact holes may be formed in a manner of being dotted under the first conductive film. The second contact holes may be dotted under the whole conductive film evenly, or may be dotted in a line, lattice, or checked manner. In this aspect, the data line may be formed over the third insulating film, and the wiring electrically connected to the internal circuit may be formed of the same film as that of the data line. According to this aspect, cost can be reduced, and the difference in total thickness between the stack structure of the connection terminal area and that of the image display area can be compensated since the wiring stacked in the image display area is utilized.

The first electro-optical device of another aspect of the invention may further comprise a counter substrate opposed to the substrate and including a counter electrode, and a pad formed of the same film as that of the first conductive film. The pad and the counter electrode may be electrically connected to each other through a conductive terminal. According to this aspect, if the pad is formed simultaneously with the formation of the first conductive film of the connection terminal unit in order to establish an electrical connection to the counter electrodes of the counter substrate, manufacturing cost can be reduced. Furthermore, if the dummy conductive film is formed as with in the connection terminal unit, superior planarity can be realized, including the formation area of the pad.

A second electro-optical device of the invention can include a connection terminal unit having a first insulating film formed over a substrate, and a first conductive film formed over the first insulating film and transmitting a signal from an external circuit. The connection terminal unit also includes a second insulating film formed over the first insulating film and planarized, and an opening formed in an area of the second insulating film that corresponds to the first conductive film and extending to the first conductive film. The second electro-optical device can further include wiring formed over a third insulating film that is under the first insulating film and electrically connected to the first conductive film through a contact hole, and an internal circuit.

According to the second electro-optical device of the invention, the second insulating film is planarized by CMP (Chemical Mechanical Polishing) treatment for example. Thus, the surface thereof has superior planarity. The opening extending to the first conductive film is formed in the second insulating film, and thereby the connection terminal unit is formed. According to this, even if the total thickness of an area where wiring or an electrode exists is different from that of an area without them in the stack structure beneath the first insulating film, the difference in level in the connection terminal area can be reduced since planarization is implemented at the second insulating film. In addition, areas with different total thickness are reduced since superior planarity can be achieved. Furthermore, the situation where shavings are generated due to the concavity and convexity when rubbing is implemented for the alignment film can be avoided. As a result, higher quality images can be displayed in the present invention.

In one aspect of the second electro-optical device of the invention, a top surface of the second insulating film may be flush with a top surface of the first conductive film. This aspect prevents the difference in level between the second insulating film and the first conductive film. Accordingly, the generation of shavings when rubbing is implemented for an alignment film can be avoided.

A third electro-optical device of the invention can include a switching element disposed in an image display area, a data line formed over a first insulating film and electrically connected to the switching element, a pixel electrode electrically connected to the switching element, and a storage capacitor having a pixel-potential-side capacitor electrode electrically connected to pixel potential of the pixel electrode, and a fixed-potential-side capacitor electrode opposed to the pixel-potential-side capacitor electrode through an insulating film. The third electro-optical device also includes a capacitance line formed over a second insulating film that is over the data line and electrically connected to the fixed-potential-side capacitor electrode, a third insulating film over the capacitance line, and a connection terminal unit. The connection terminal unit can include a first conductive film formed of the same film as that of the capacitance line over the second insulating film and transmitting a signal from an external circuit, and an opening formed in an area of the third insulating film that corresponds to the first conductive film and extending to the first conductive film. The third electro-optical device further includes wiring formed of the same film as that of the data line over the first insulating film and electrically connected to the first conductive film through a contact hole, and an internal circuit.

According to the third electro-optical device of the invention, the first conductive film is formed of the same film as that of the capacitance line, which is on a layer above the data line, and the wiring electrically connected to the internal circuit is formed of the same film as that of the data line. This allows the first conductive film to be formed on an upper layer side such that the difference in level between the third insulating film and the first conductive film can be reduced. Accordingly, the generation of shavings when rubbing is implemented for an alignment film can be reduced. In addition, the depth of the contact hole interconnecting the first conductive film and wiring can be decreased since the wiring electrically connected to the internal circuit is formed of the same film as that of the data line, which is beneath the capacitance line.

A method of manufacturing an electro-optical device of the invention can include the steps of forming a first insulating film over a substrate and planarizing a surface of the first insulating film, and forming a first conductive film formed over the first insulating film and transmitting a signal from an external circuit. The method also includes the steps of forming a second insulating film over the first insulating film and the first conductive film and planarizing the second insulating film, and removing an area of the second insulating film that corresponds to the first conductive film to uncover the first conductive film so as to form a connection terminal unit.

According to the method of manufacturing the electro-optical device of the invention, the above electro-optical device of the invention can relatively easily be manufactured.

In one aspect of the method of manufacturing an electro-optical device of the invention, the first conductive film may be formed simultaneously with a capacitance line formed in an image display area. The second conductive film may be formed simultaneously with a data line formed in the image display area.

An electronic apparatus of the invention can include the electro-optical device of the invention including the above various aspects. According to the electronic apparatus of the invention, shavings of an alignment film are hardly generated when rubbing is implemented for the alignment film since the electronic apparatus includes the electro-optical device of the invention. Thus, realized are various electronic apparatuses, such as a liquid crystal television, a cellular phone, an electronic notebook, a word processor, a video tape recorder of view finder type or monitoring type, a work station, a television telephone, a POS terminal, and a touch panel that can display high quality images.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The above-described operation and other advantageous effects of the invention will become apparent from embodiments to be described below.

Embodiments of the invention will be described below with reference to accompanying drawings. The following embodiments are related to a liquid crystal device where an electro-optical device of the invention is applied.

Figure 1:
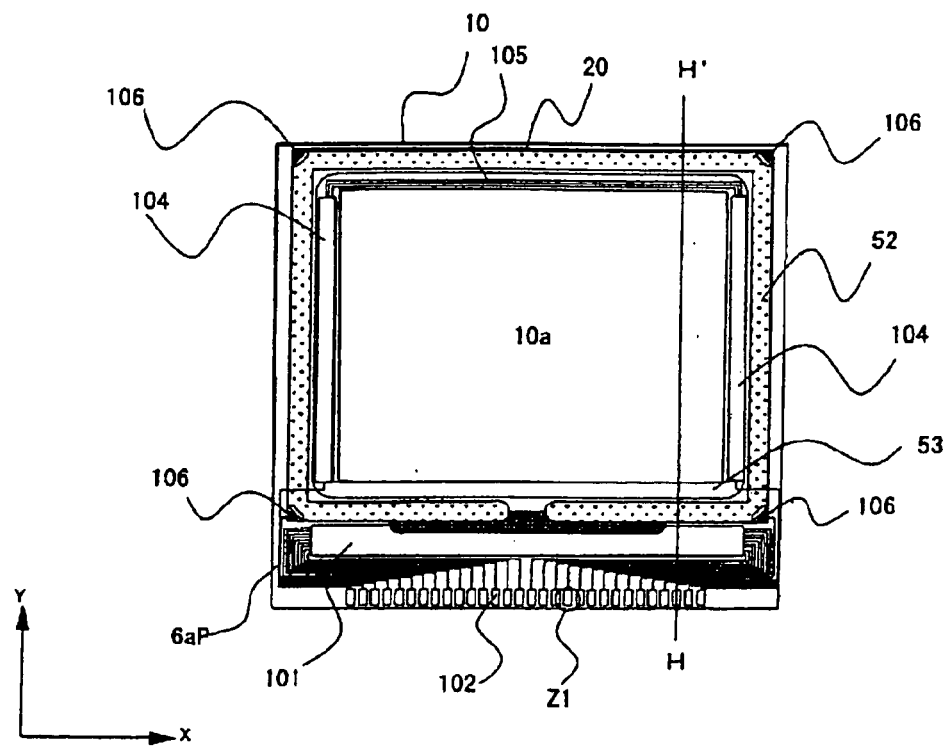
FIG. 1 is a plan view of an electro-optical device when viewing a TFT array substrate and each component formed thereon from a counter substrate side.
Figure 2:
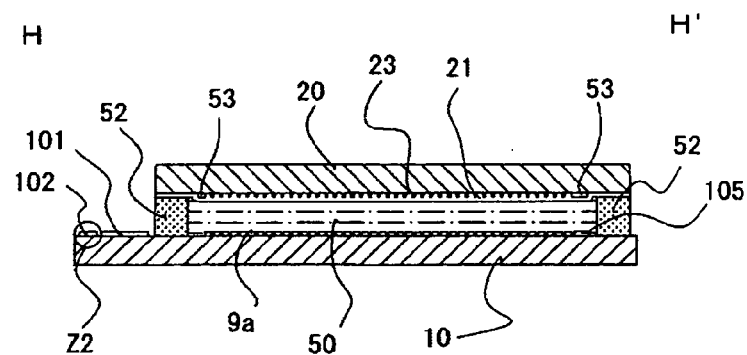
FIG. 2 is a sectional view along H-H' line of FIG. 1.

First, the whole structure of a first embodiment according to an electro-optical device of the invention will be described referring to FIGS. 1 and 2. FIG. 1 is a plan view of an electro-optical device when viewing a TFT array substrate and each component formed thereon from a counter substrate side. FIG. 2 is a sectional view along H-H' line of FIG. 1. A TFT active-matrix-driven liquid crystal device of driver built-in type that is one example of an electro-optical device will be described by way of example.

Referring to FIGS. 1 and 2, in an electro-optical device according to a first embodiment, a TFT array substrate 10 and a counter substrate 20 are opposed to each other. A liquid crystal layer 50 is sealed between the TFT array substrate 10 and the counter substrate 20. The TFT array substrate 10 and the counter substrate 20 are joined to each other with a sealing material 52 provided on a sealing area that is located in the periphery of an image display area 10a.

The sealing material 52 is composed of, for example, ultraviolet rays (UV) curing resin, and thermosetting resin for joining the both substrates. The sealing material 52 can be cured by UV irradiation, heating, etc. after being applied on the TFT array substrate 10 in a manufacturing process. In the sealing material 52, dispersed is a gap material, such as a glass fiber or a glass bead, for setting the interval between the TFT array substrate 10 and the counter substrate 20 (the gap between the substrates) to be a certain value. Namely, an electro-optical device of the first embodiment is suitable for displaying magnified images with small device size, as a light valve of a projector.

A frame light shielding film 53 of light shielding that defines a frame area of the image display area 10a is provided on a counter substrate 20 side parallel with the inside of a sealing area where the sealing material 52 is provided. Part or whole of the frame light shielding film 53 may be provided on a TFT array substrate 10 side as a built-in light shielding film. Meanwhile, a peripheral area defining the periphery of the image display area 10a exists in the first embodiment. In other words, especially in the first embodiment, an area beyond the frame light shielding film 53 when viewing from the center of the TFT array substrate 10 is defined as a peripheral area.

Above an area located in the outside of the sealing area where the sealing material 52 is provided, of the peripheral area, provided are a data line driver 101 and connection terminals 102 for external circuit along one side of the TFT array substrate 10. Scanning line drivers 104 are provided along two sides adjoining this side in a manner of being covered by the frame light shielding film 53. In order to interconnect two scanning line drivers 104 provided on both sides of the image display area 10a, a plurality of wiring 105 is provided along the remaining side of the TFT array substrate 10 in a manner of being covered by the frame light shielding film 53. The data line driver 101 and the scanning line drivers 104 are connected to the connection terminals 102 for external circuit through wiring 6aP. Details about this will be described in greater detail below.

Vertical conduction terminals 106 are disposed on four corner parts of the counter substrate 20. This enables electrical conduction between the TFT array substrate 10 and the counter substrate 20.

Referring to FIG. 2, above the TFT array substrate 10, an alignment film not shown in the drawing is formed over pixel electrodes 9a for which TFTs for switching pixel, and wiring such as scanning lines and data lines have been formed. Meanwhile, counter electrodes 21 and a light shielding film 23 of a lattice or stripe manner are formed above the counter substrate 20, and an alignment film not shown in the drawing is formed over the uppermost layer portion thereof. A liquid crystal layer 50 is composed of liquid crystal prepared by blending one kind or several kinds of nematic liquid crystal for example, and assumes a given orientation state between the pair of alignment films.

In an electro-optical device of the first embodiment having the above-described whole structure, the concrete structure pertinent to the connection terminals 102 for external circuit has advantageous features. Details about this will be described below with reference to FIG. 7.

In addition to the data line driver 101 and the scanning line drivers 104, a sampling circuit that samples image signals in image signal lines so as to supply them to data lines, a pre-charge circuit that supplies pre-charge signals at a given voltage level to a plurality of data lines previous to image signals, an inspection circuit for inspecting the quality and defect of the electro-optical device on the way of manufacturing and when shipping, may be formed above the TFT array substrate 10 shown in FIGS. 1 and 2.

Figure 3:
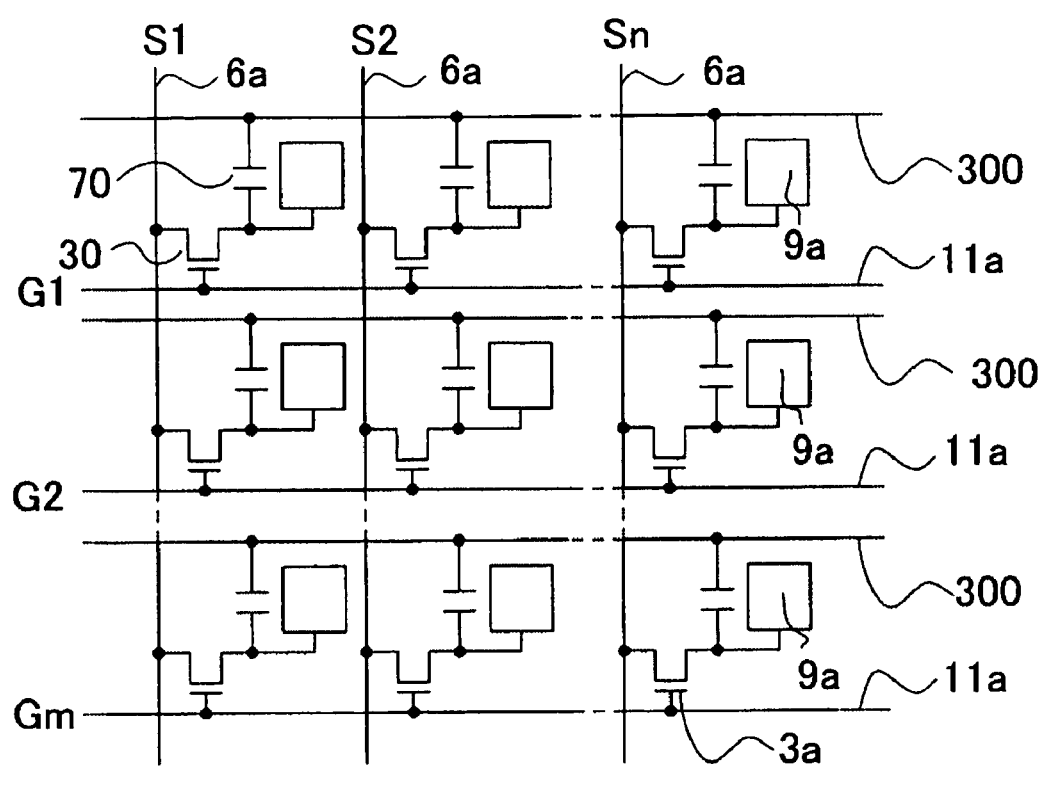
FIG. 3 shows an equivalent circuit with various elements, wiring, and so on in a plurality of pixels formed in a matrix and constituting an image display area of the electro-optical device.
Figure 4:
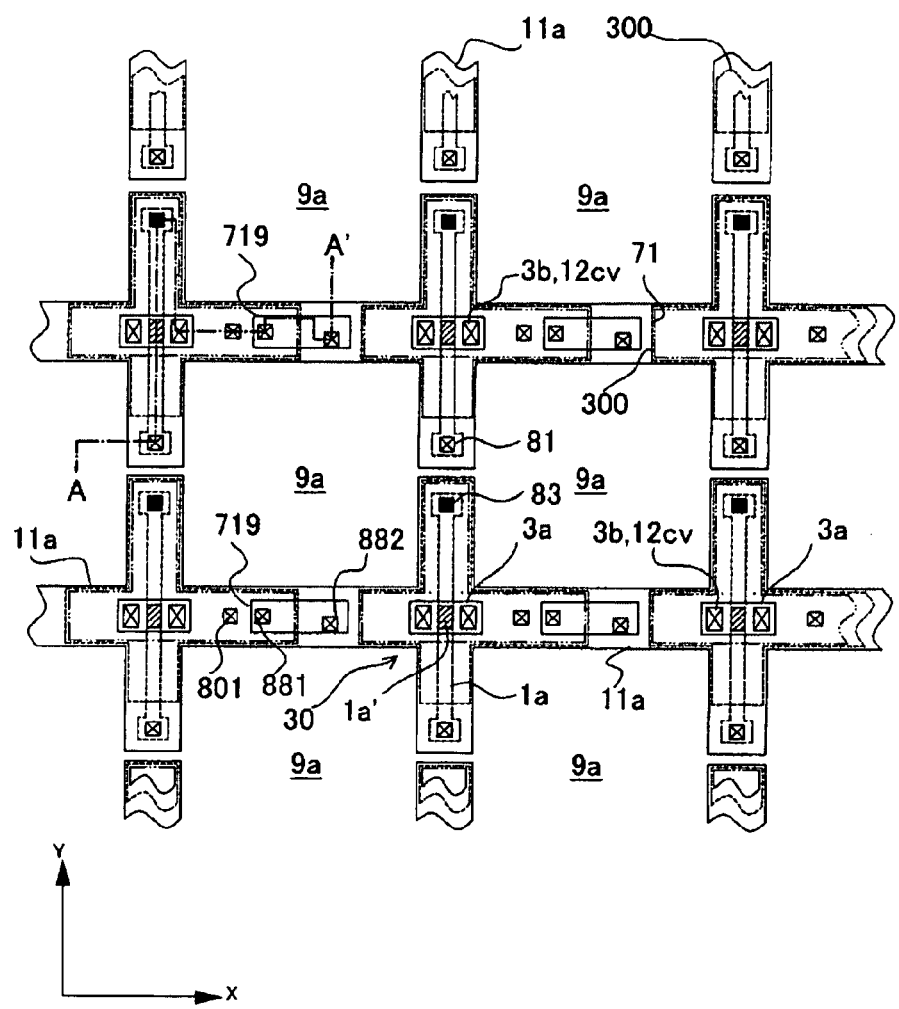
FIG. 4 is a plan view of a plurality of pixel groups adjacent to each other on the TFT array substrate where a data line, a scanning line, a pixel electrode, and so on are formed, and shows only a structure of a lower layer section (a lower layer section up to numeral 70 (storage capacitor) in FIG. 6)
Figure 5:
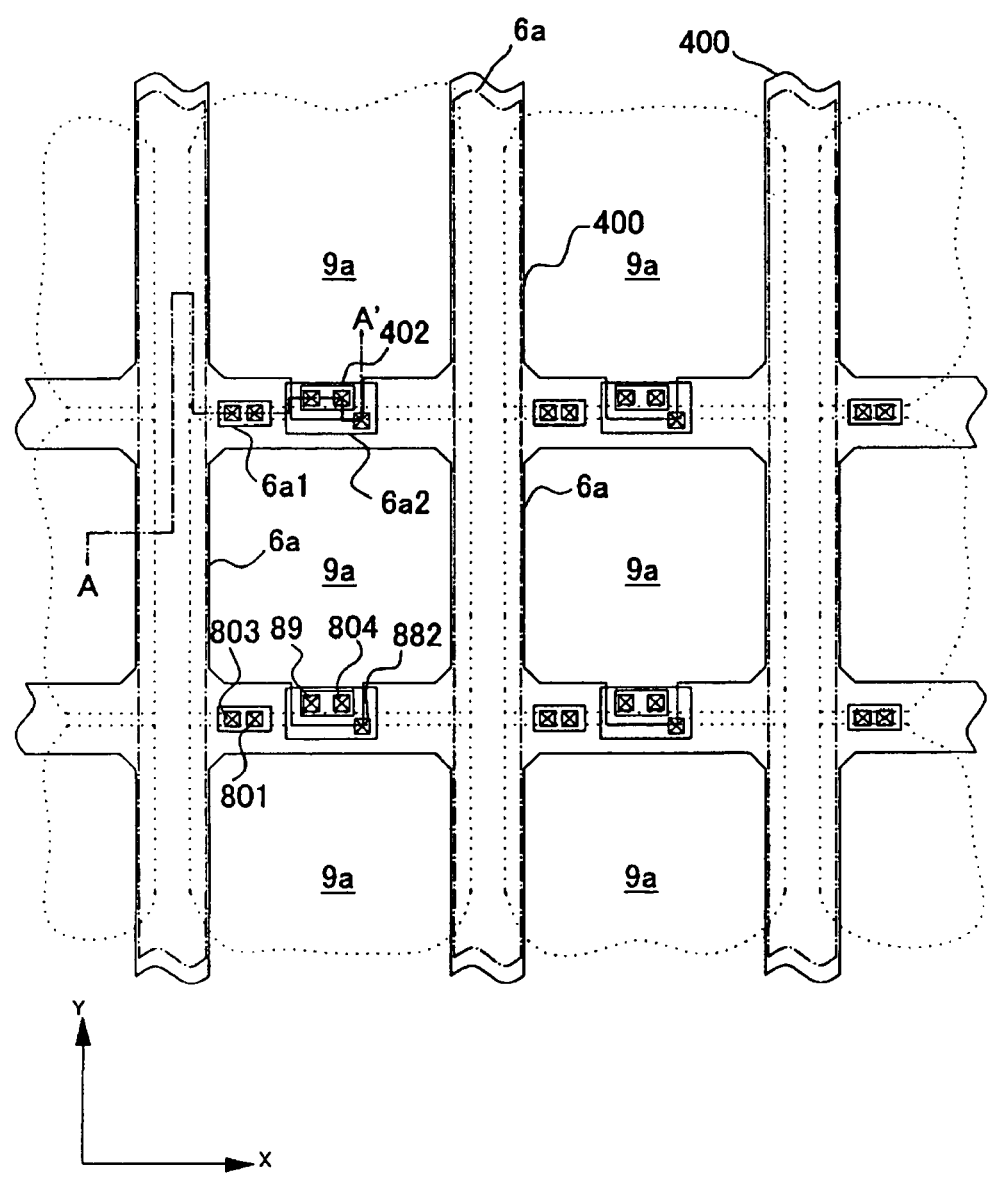
FIG. 5 is a plan view of a plurality of pixel groups adjacent to each other on the TFT array substrate where the data line, the scanning line, the pixel electrode, and so on are formed, and shows only a structure of an upper layer section (an upper layer section over numeral 70 (storage capacitor) in FIG. 6)

Details about the structure of a pixel unit of the electro-optical device according to the first embodiment of the invention will be described below referring to FIGS. 3 through 8. FIG. 3 shows an equivalent circuit with various kinds of elements, wiring, and so on in a plurality of pixels formed in a matrix and constituting the image display area of the electro-optical device. FIGS. 4 and 5 are plan views of a plurality of pixel groups adjacent to each other of the TFT array substrate where data lines, scanning lines, pixel electrodes are formed. FIGS. 4 and 5 show a lower layer section (FIG. 4) and an upper layer section (FIG. 5), of the stack structure to be described later, respectively.

Figure 6:
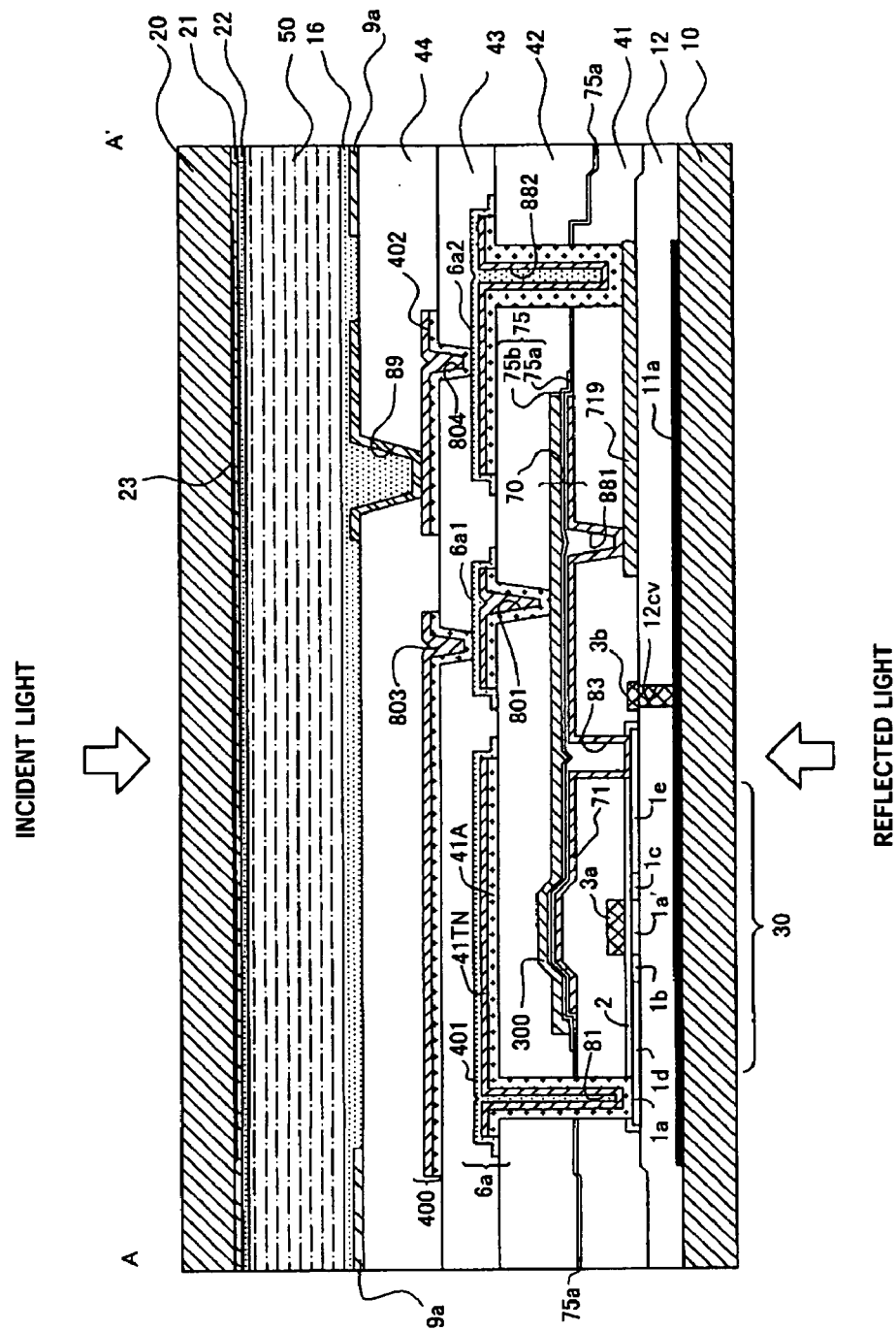
FIG. 6 is a sectional view of A-A' line when stacking the sections of FIGS. 4 and 5.
Figure 7:
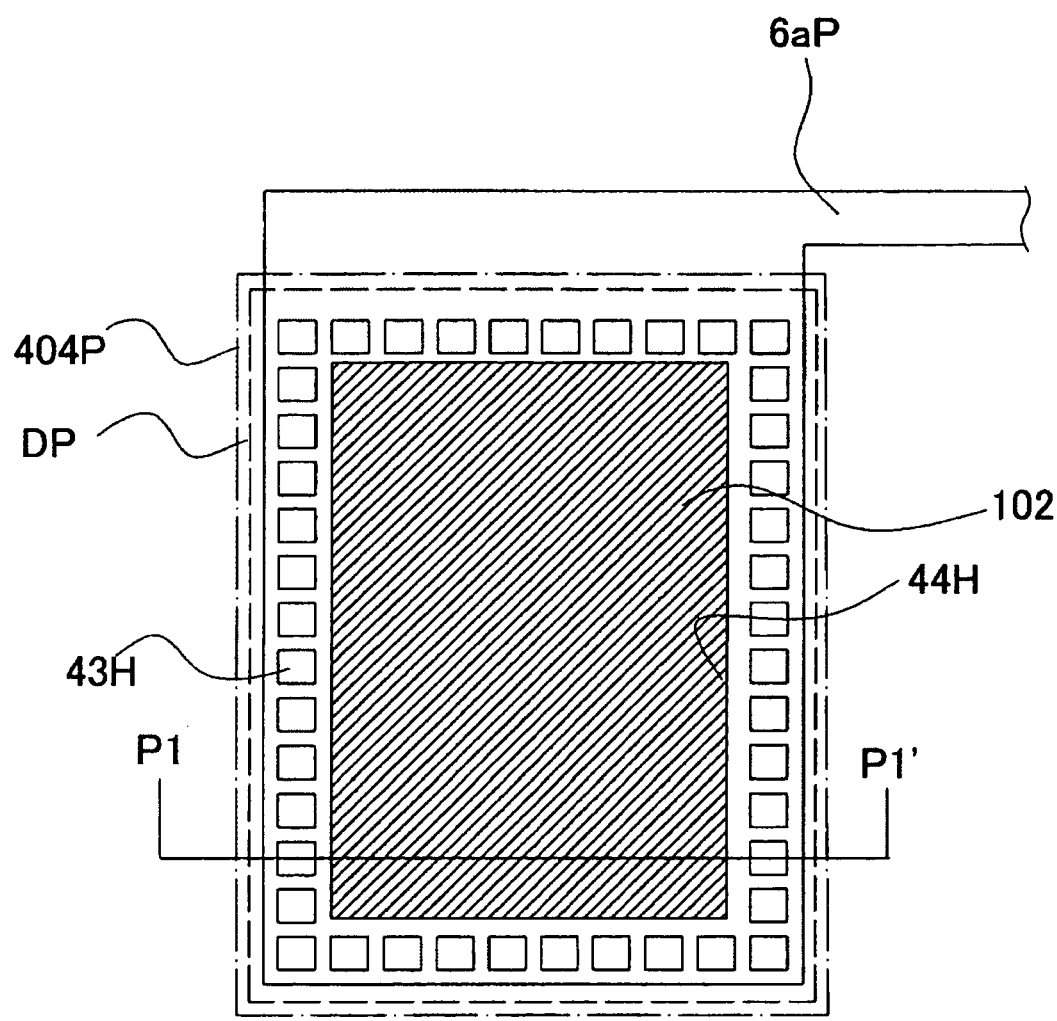
FIG. 7 is a plan view obtained by magnifying the inside of the circle with numeral Z1 in FIG. 1 (connection terminal for external circuit and the vicinity thereof)
Figure 8:
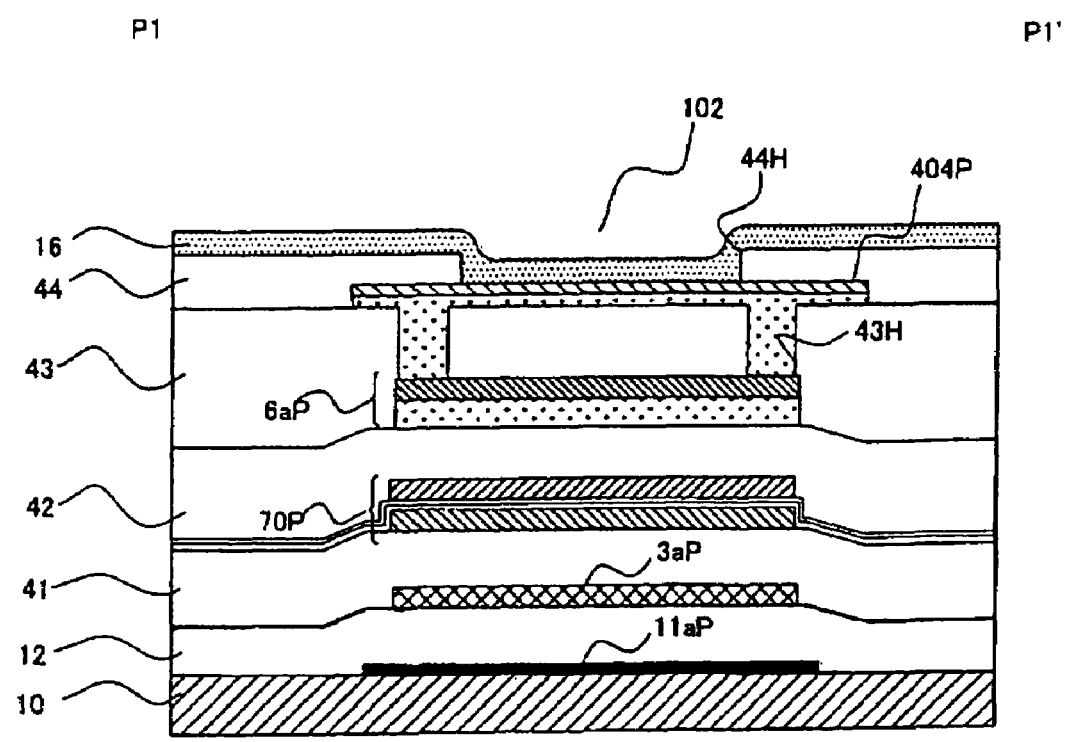
FIG. 8 is a sectional view along P1-P1' line of FIG. 7 (it is a magnified view of the inside of the circle with numeral Z2 in FIG. 2 as well as a sectional view corresponding to the stack structure shown in FIG. 6)

FIG. 6 is a sectional view of A-A' line when stacking the sections of FIGS. 4 and 5. FIG. 7 is a plan view showing the magnification of the inside of a circle with numeral Z1 in FIG. 1 (the connection terminal 102 for external circuit and the vicinity thereof). FIG. 8 is a sectional view of P1-P1' line of FIG. 7, and is a magnified view of the inside of a circle with numeral Z2 in FIG. 2 as well as a sectional view corresponding to the stack structure shown in FIG. 6. In FIGS. 6 and 8, scale is different for each layer and member in order to illustrate each layer and member in recognizable size in the diagram.

Referring to FIG. 3, for the plurality of pixels formed in a matrix and constituting the image display area of the electro-optical device of the first embodiment, the pixel electrodes 9a and TFTs 30 for controlling the switching of the pixel electrodes 9a are formed corresponding to intersections of data lines 6a and scanning lines 11a. The data lines 6a, to which image signals are supplied, are electrically connected to the sources of the TFTs 30. Image signals S1, S2, through Sn, which are written to the data lines 6a, may be supplied in this order line sequentially, or may be supplied to a plurality of data lines 6a adjacent to each other in groups.

The scanning lines 11a are electrically connected to gate electrodes 3a of the TFTs 30 such that scanning signals G1, G2, through Gm are applied in a pulse manner at a given timing, to the scanning lines 11a and the gate electrodes 3a in this order line sequentially. The pixel electrodes 9a are electrically connected to the drains of the TFTs 30. The TFTs 30, which are switching elements, are switched off during a certain period, and thereby the pixel electrodes 9a write the image signals S1, S2, through Sn supplied from the data lines 6a at a given timing.

The image signals S1, S2, through Sn, which have been written to liquid crystal that is one example of electro-optical materials via the pixel electrodes 9a, are maintained between the counter electrodes formed above the counter substrate and the liquid crystal during a certain period. In liquid crystal, the orientation and order of molecule assembly change depending on applied voltage level so as to modulate light, enabling grayscale display. In the case of a normally white mode, transmittance for incident light decreases in response to voltage applied on a pixel basis, while in the case of a normally black mode, transmittance for incident light increases in response to voltage applied on a pixel basis. As a whole, light having contrast depending on the image signals are output from the electro-optical device.

In order to prevent the leakage of the maintained image signals, storage capacitors 70 can be provided parallel with a liquid crystal capacitance formed between the pixel electrodes 9a and counter electrodes. Each of storage capacitors 70 comprises each pixel-potential-side capacitor electrode and each fixed-potential-side capacitor electrode 300 fixed to constant potential with a dielectric film interposed therebetween.

The structure of the electro-optical device that achieves the above circuit operation by utilizing the data lines 6a, the scanning lines 11a, the gate electrodes 3a, and the TFTs 30 will be described below referring to FIGS. 4 through 7.

Referring to FIGS. 4 and 5, the plurality of pixel electrodes 9a are provided above the TFT array substrate 10 in a matrix (the outlines thereof are illustrated as dashed lines in FIG. 5). The data lines 6a and scanning lines 11a are provided along the vertical and horizontal boundaries of the pixel electrodes 9a, respectively. The scanning lines 11a are formed on a layer under the semiconductor layers 1a of the TFTs 30, which is on a TFT array substrate 10 side across the semiconductor layers 1a. Each of scanning lines 11a is electrically connected to each of gate electrodes 3a facing one of channel regions 1a' illustrated as hatched areas in the diagram, of one of the semiconductor layers 1a, through one of contact holes 12cv. The gate electrodes 3a are included in the scanning lines 11a. Namely, each of TFTs 30 for switching pixel where each of gate electrodes 3a included in each of scanning line 11a is opposed to one of the channel regions 1a' is provided on a place where one of the gate electrodes 3a and one of the data lines 6a intersect.

As shown in FIG. 6, which is a sectional view of A-A' line of FIGS. 4 and 5, the electro-optical device includes the TFT array substrate 10 composed of, for example, a quartz substrate, a glass substrate, and a silicon substrate, and the counter substrate 20 composed of, for example, a glass substrate and a quartz substrate that is opposed to the TFT array substrate 10.

As shown in FIG. 6, the pixel electrodes 9a are provided on a TFT array substrate 10 side, and an alignment film 16 for which a certain alignment treatment, such as rubbing, is implemented is provided above the pixel electrodes 9a. The pixel electrode 9a are composed of a transparent conductive film such as an ITO film for example. Meanwhile, the counter electrodes 21 are provided on a counter substrate 20 side, and an alignment film 22 for which a certain alignment treatment such as rubbing is implemented is provided under the counter electrodes 21. The counter electrodes 21 are composed of a transparent conductive film such as an ITO film for example, as with the pixel electrodes 9a.

Between the TFT array substrate 10 and the counter substrate 20 opposed to each other as above, an electro-optical material, such as liquid crystal, is sealed in a space surrounded by the sealing material 52 (refer to FIGS. 1 and 2) so as to form the liquid crystal layer 50. The liquid crystal layer 50 is set to a given orientation state by the alignment films 16 and 22 when electric field is not applied from the pixel electrodes 9a. Liquid crystal of the liquid crystal layer 50 may be twist-nematic liquid crystal, or may be liquid crystal for vertical orientation.

Meanwhile, above the TFT array substrate 10, in addition to the pixel electrodes 9a and the alignment film 16, various kinds of components including these elements are provided in a stack structure manner. As shown in FIG. 6, the stack structure can include, in the order from below, a first layer including the scanning line 11a, a second layer that includes the TFT 30 having the gate electrode 3a, and so on, a third layer including the storage capacitor 70, a fourth layer including the data line 6a and so on, a fifth layer including capacitance wiring 400 that is one example of first wiring in the invention, and so on, and a sixth layer (uppermost layer) including the pixel electrodes 9a, the alignment film 16, and so on.

An underlayer insulating film 12 is provided between the first and second layers. Furthermore, provided are a first interlayer insulating film 41 between the second and third layers, a second interlayer insulating film 42 between the third and fourth layers, a third interlayer insulating film 43 between the fourth and fifth layers, and a fourth interlayer insulating film 44 between the fifth and sixth layers. These insulating films prevent short-circuit between the components. In the insulating films 12, 41, 42, 43, and 44, for example, contact holes for electrically interconnecting a highly-doped source region 1d in the semiconductor layer 1a of the TFT 30 and the data line 6a, and so on are provided. Details about these components will be described below in the order from bottom layer. The first through third layers are shown in FIG. 4 as the lower layer section. The fourth through sixth layers are shown in FIG. 5 as the upper layer section.

On the first layer, provided is the scanning line 11a composed of, for example, elemental metal, alloy, metal silicide, poly-silicide, a stack of these materials that include at least one of refractory metals, such as titanium (Ti), chromium (Cr), tungsten (W), tantalum (Ta), and molybdenum (Mo), or conductive poly-silicon. The scanning lines 11a are patterned in a stripe along a X-direction of FIG. 4 when viewed from above. Specifically, each of scanning lines 11a of a stripe manner includes a main line portion extending along the X-direction of FIG. 4, and protruding portions extending along a Y-direction of FIG. 4 along which data lines 6a are extended. The protruding portions extending from each of scanning lines 11a adjacent to each other are not connected to each other. The scanning lines 11a therefore are divided into each one line.

This allows each of scanning lines 11a to have a function of simultaneously controlling the "on" and "off" of the TFTs 30 existing in the same row. Meanwhile, in the case of the scanning line 11a of light shielding, the scanning line 11a also has a function of shielding light entering the TFT 30 from below since the scanning line 11a is formed in a manner of roughly covering the area where the pixel electrodes 9a are not formed. This prevents the light leakage current in the semiconductor layer 1a of the TFT 30, enabling high quality image display without flicker and so on.

The TFT 30 including the gate electrode 3a is provided on the second layer. As shown in FIG. 6, the TFT 30 has an LDD (Lightly Doped Drain) structure. As structural components, the TFT 30 includes the gate electrode 3a, and the channel region 1a' of the semiconductor layer 1a that is composed of a conductive poly-silicon film for example, and where a channel is formed by an electric field from the gate electrode 3a. The TFT 30 also includes an insulating layer 2 including a gate insulating film that insulates the gate electrode 3a from the semiconductor layer 1a, a lightly-doped source region 1b, a lightly-doped drain region 1c, a highly-doped source region 1d, and a highly-doped drain region 1e, in the semiconductor layer 1a.

In the first embodiment, in the second layer, a relay electrode 719 formed of the same film as that of the gate electrode 3a is formed on the underlayer insulating film 12. As shown in FIG. 4, each relay electrode 719 is formed in an island shape and is located in the generally center of a side extending along an X-direction, of each of pixel electrodes 9a, when viewed from above. The relay electrode 719 is formed of a conductive poly-silicon film and the like since the relay electrode 719 is formed of the same film as that of the gate electrode 3a.

The TFT 30 preferably has an LDD structure as shown in FIG. 6. The TFT 30, however, may have an offset structure where impurities are not implanted into the lightly-doped source region 1b and the lightly-doped drain region 1c. Otherwise, the TFT 30 may be a self-aligned TFT where high concentration impurities are implanted utilizing the gate electrode 3a as a mask so as to form the highly-doped source region and the highly-doped drain region in a self-alignment manner. Although in the first embodiment, used is a single gate structure where only one gate electrode of the TFT 30 for switching pixel is disposed between the highly-doped source region 1d and the highly-doped drain region 1e, two or more gate electrodes may be disposed along these regions.

In the case where the TFT includes dual gate, triple gate, or more, leakage current of junction part between the channel, and source region or drain region can be avoided such that the amount of current during "off" can be reduced. The semiconductor layer 1a constituting the TFT 30 may be a non-single-crystal layer, or may be a single-crystal layer. A known method, such as a joining method, is available for forming a single-crystal layer. Utilizing a single-crystal layer as the semiconductor layer 1a enables the performance of peripheral circuits to be improved especially.

Over the scanning line 11a, and under the TFT 30, the underlayer insulating film 12 composed of a silicon oxide film and the like is provided. In addition to a function of insulating the TFT 30 from the scanning line 11a, the underlayer insulating film 12 has a function of preventing the characteristic change of the TFT 30 for switching pixel due to the roughness of surface of the TFT array substrate 10 caused when surface polishing thereof and dust remaining after cleaning thereof, by being formed over the whole of the TFT array substrate 10.

In the underlayer insulating film 12, the contact hole 12cv of a trench manner is formed along a direction of channel length of the semiconductor layer 1a, which extends along each data line 6a to be described later, at both sides of each semiconductor layer 1a when viewed from above (refer to FIG. 4). The gate electrode 3a deposited above the contact hole 12cv includes a potion formed in a manner of being concave downward. The gate electrode 3a is formed in a manner of burying the whole of the contact hole 12cv, and thereby a sidewall part 3b formed monolithically with the gate electrode 3a is extended from the gate electrode 3a. According to this, the semiconductor layer 1a of each of TFTs 30 is covered from the side when viewed from above as shown in FIG. 4, such that incident light at least from these parts is suppressed.

The sidewall part 3b is formed so that the contact hole 12cv is buried, while the lower end of the sidewall part 3b makes contact with the scanning lines 11a. The scanning lines 11a are formed independently from each other as described above. Thus, the gate electrodes 3a and the scanning lines 11a on a certain row invariably have the same potential as long as attention is focused on the row.

In the invention, another scanning lines including the gate electrodes 3a and formed as the same layer as the gate electrodes 3a may be formed in parallel to the scanning lines 11a. In this case, another scanning lines and the scanning lines 11a are electrically connected to each other outside the display area so as to form a redundant wiring structure for example. According to this, even in the case where part of the scanning lines 11a involves any defect such that normal electrical conduction becomes impossible for example, as long as another scanning lines existing in the same row as that of the scanning lines 11a with defect are sound, the normal operation control of the TFTs 30 is still maintained by using the scanning lines.

On the third layer, there is provided the storage capacitor 70. The storage capacitor 70 is formed by opposing a lower electrode 71 as a pixel-potential-side capacitor electrode connected to the highly-doped drain region 1e of the TFT 30 and the pixel electrode 9a, and the capacitor electrode 300 as a fixed-potential-side capacitor electrode through a dielectric film 75. The storage capacitor 70 enables the potential holding characteristic in the pixel electrodes 9a to be notably improved. Each storage capacitor 70 according to the first embodiment overlaps with a formation region that is at a border of the pixel electrode 9a adjacent to the storage capacitor 70, as is apparent from a plan view of FIG. 4. The storage capacitor 70, however, is formed so as not to overlap with a light transmitting area approximately corresponding to the formation area of the pixel electrode 9a. Namely, each storage capacitor 70 is formed in a manner of being located within a light shielding area such that the pixel aperture ratio of the whole electro-optical device is kept relatively large. Thus, brighter image can be displayed.

Specifically, the lower electrode 71 can be composed of a conductive poly-silicon film for example and functions as a pixel-electrode-side capacitor electrode. The lower electrode 71, however, may be composed of a mono-layer film or multi-layered film including metal or alloy. Furthermore, the lower electrode 71 has a function to relay-interconnect the pixel electrode 9a and the highly-doped drain region 1e of the TFT 30. Incidentally, relay-interconnection here is implemented through the relay electrode 719 and other elements.

The capacitor electrode 300 functions as a fixed-electrode-side capacitor electrode of the storage capacitor 70. The capacitor electrode 300 has the same shape as that of the lower electrode 71, and constitutes an island electrode as with the lower electrode 71. In the first embodiment, in order to set the potential of the capacitor electrode 300 to fixed potential, the capacitor electrode 300 is electrically connected to the capacitance wiring 400 (to be described later) whose potential is set to fixed potential. The capacitor electrode 300 is composed of elemental metal, alloy, metal silicide, poly-silicide, a stack of these materials that include at least one of refractory metals such as Ti, Cr, W, Ta, and Mo, and is preferably composed of tungsten silicide. This allows the capacitor electrode 300 to have a function to shield light entering the TFT 30 from above.

The dielectric film 75 is composed of, for example, relatively thin oxide silicon films, such as an HTO (High Temperature Oxide) film and an LTO (Low Temperature Oxide) film, or a nitride silicon film whose thickness is about 5 nm to 200 nm, as shown in FIG. 6. In view of increasing the capacitance of the storage capacitor 70, the dielectric film 75 is preferably thinner as long as the reliability thereof is sufficient.

In the first embodiment, the dielectric film 75 has a double-layer structure of an oxide silicon film 75a as a lower layer and a nitride silicon film 75b as an upper layer as shown in FIG. 6. The nitride silicon film 75b of the upper layer is patterned to have a bit larger size than that of the lower electrode 71 as a pixel-potential-side capacitor electrode so as to be placed within the light shielding area (non-aperture area).

This allows the nitride silicon film 75b to have relatively large dielectric constant, and thereby the capacitance value of the storage capacitor 70 can be increased. Nonetheless, the voltage resistance of the storage capacitor 70 is not decreased since the oxide silicon film 75a exists. Thus, forming the dielectric film 75 as a double-layer structure enables two contrary advantageous effects to be achieved. The nitride silicon film 75b, which is colored, is patterned to have a bit large size than that of the lower electrode 71 and is not formed over the light transmitting part light (be located within the light shielding area). The decrease of transmittance therefore can be prevented. In addition, the penetration of water into the TFTs 30 can be avoided since the nitride silicon film 75b exists. This avoids the rise of the threshold voltage in the TFTs 30, enabling the device to be operated over a relatively long period. The pattern shape of the dielectric film 75 may be the same as that of the lower electrode 71 of the storage capacitor 70, and that of the capacitor electrode 300.

Although the dielectric film 75 has a double-layer structure in the first embodiment, it may have a triple-layer structure of, for example, an oxide silicon film, a nitride silicon film, and an oxide silicon film. Otherwise, it may have a stack structure including more layers. A mono-layer structure is also available, of course.

Over the TFT 30, the gate electrode 3a, and the relay electrode 719, and under the storage capacitor 70, formed is the first interlayer insulating film 41. The first interlayer insulating film 41 is composed of, for example, a film of silicate glass such as NSG (non-doped silicate glass), PSG (phosphosilicate glass), BSG (borosilicate glass), and BPSG (borophosphosilicate glass), a nitride silicon film, and an oxide silicon film, or is preferably composed of a NSG.

In the first interlayer insulating film 41, a contact hole 81 electrically interconnecting the highly-doped source region Id of the TFT 30 and the data line 6a to be described later is formed through the second interlayer insulating film 42. In addition, in the first interlayer insulating film 41, formed is a contact hole 83 electrically interconnecting the highly-doped drain region 1e of the TFT 30 and the lower electrode 71 constituting the storage capacitor 70. Furthermore, in the first interlayer insulating film 41, formed is a contact hole 881 electrically interconnecting the lower electrode 71 as a pixel-potential-side capacitor electrode constituting the storage capacitor 70, and the relay electrode 719. Moreover, in the first interlayer insulating film 41, a contact hole 882 electrically interconnecting the relay electrode 719 and a second relay electrode 6a2 to be described later is formed through the second interlayer insulating film. The relay electrode 719 is formed of the same material as that of the gate electrode 3a.

In the first embodiment, ions implanted into the polysilicon film constituting the semiconductor layer 1a and the gate electrode 3a may be activated by annealing the first interlayer insulating film 41 at about 1000 degrees centigrade.

On the fourth layer, provided is the data line 6a. The data line 6a is formed as a film having a triple-layer structure of an aluminum layer (refer to numeral 41A of FIG. 6), a nitride titanium layer (refer to numeral 41TN of FIG. 6), and a nitride silicon film layer (refer to numeral 401 of FIG. 6) in this order from bottom. The nitride silicon film is patterned to have a bit larger size so as to cover the aluminum layer and nitride titanium layer, which are lower layers. The supply of image signals to the TFT 30 and the pixel electrode 9a is achieved without delay since the data line 6a includes aluminum, which is a material having relatively low electrical resistance. Meanwhile, the nitride silicon film, which is relatively advantageous for avoiding the penetration of water, is formed in the data line 6a. The moisture resistance of the TFT 30 therefore can be improved such that the life of the device can be prolonged. The nitride silicon film is desirably a plasma nitride silicon film.

On the fourth layer, formed are a relay layer 6a1 for capacitance wiring and the second relay electrode 6a2 that are formed of the same film as the data line 6a. As shown in FIG. 5, these elements are not formed so as to have a planar shape contiguous with the data lines 6a but formed so as to be separated from the data lines 6a in the patterning when viewed from above. For example, when attention is focused on one of the data lines 6a that is located in most-left in FIG. 5, the relay layer 6a1 for capacitance wiring of a generally quadrate shape is formed just right thereto, and right to the relay layer 6a1, formed is the second relay electrode 6a2 of a generally quadrate shape having a bit larger area than that of the relay layer 6a1 for capacitance wiring.

Incidentally, the relay layer 6a1 for capacitance wiring and the second relay electrode 6a2 are formed of the same film as that of the data line 6a so as to have a triple-layer structure of an aluminum layer, a nitride titanium layer, and a plasma nitride film layer in this order from bottom. The plasma nitride film is patterned to have a bit larger size so as to cover the aluminum layer and nitride titanium layer, which are lower layers. The nitride titanium layer functions as a barrier metal for preventing punch-through of etching of contact holes 803 and 804 (to be described later) that are formed for the relay layer 6a1 for capacitance wiring and the second relay electrode 6a2. The nitride silicon film is relatively advantageous for avoiding the penetration of water. The moisture resistance of the TFT 30 therefore can be improved such that the life of the device can be prolonged. Such a nitride silicon film is formed over the formation area of the data line 6a as well as over that of the relay layer 6a1 for capacitance wiring and the second relay layer 6a2 such that the total area of the nitride silicon film relatively increases. Thus, the advantageous effect of preventing the penetration of water is more effectively achieved.

Over the storage capacitor 70, and under the data line 6a, formed is the second interlayer insulating film 42 that is composed of, for example, a film of silicate glass such as NSG, PSG, BSG, and BPSG, a nitride silicon film, and an oxide silicon film, or is preferably formed by a plasma CVD method employing TEOS gas. In the second interlayer insulating film 42, the contact hole 81 electrically interconnecting the highly-doped source region Id of the TFT 30 and the data line 6a is formed, while a contact hole 801 electrically interconnecting the relay layer 6a1 for capacitance wiring and the capacitor electrode 300 that is an upper electrode of the storage capacitor 70. Furthermore, in the second interlayer insulating film 42, formed is the contact hole 882 electrically interconnecting the second relay electrode 6a2 and the relay electrode 719.

Meanwhile, the annealing treatment, which is implemented for the first interlayer insulating film 41, may not be implemented for the second interlayer insulating film 42, and thereby the stress caused in the vicinity of the boundary of the capacitor electrode 300 may be relieved.

On the fifth layer, there is provided the capacitance wiring 400. The capacitance wiring 400 is formed on the third interlayer insulating film 43. The surface of the third interlayer insulating film 43 may be planarized by implementing planarizing treatment such as CMP (Chemical Mechanical Polishing) treatment. As shown in FIG. 5, the capacitance wirings 400 are formed in a lattice manner so as to be extended along X and Y directions in the drawing when viewed from above. Specifically, the portion extending along Y direction in the drawing, of each capacitance wiring 400, is formed in a manner of covering each data line 6a, and have a larger width than that of the data line 6a. Meanwhile, the portion extending along X direction in the drawing has a cut part near the center of a side of each pixel electrode 9a in order to ensure the area where a third relay electrode 402 to be described later is formed.

Furthermore, in FIG. 5, at corner parts of the intersection of the capacitance wirings 400 extending along X and Y directions, generally triangular portions are provided so as to cover the corner parts. Providing the generally triangular portions for the capacitance wiring 400 enables light shielding for the semiconductor layer 1a of the TFT 30 to be effectively achieved. Namely, light entering the semiconductor layer 1a from obliquely above is reflected or absorbed at the generally triangular portions so as not to reach the semiconductor layer 1a. The generation of light leakage current therefore is suppressed such that high quality image without flicker and so on can be displayed.

The capacitance wiring 400 is extended from the image display area 10a where the pixel electrodes 9a are disposed, to the periphery thereof, and is electrically connected to a constant potential source so as to be set to fixed-potential (refer to details about a pad 404P to be described below).

Thus, owing to the capacitance wirings 400, which are formed in a manner of covering the whole of the data lines 6a and are set to fixed potential, the effect of capacitance coupling caused between the data lines 6a and the pixel electrodes 9a can be eliminated. Namely, the situation where the potential of the pixel electrodes 9a changes in response to energization to the data lines 6a can previously be avoided. Accordingly, the generation of display unevenness along the data lines 6a on the image can be reduced. Especially in the first embodiment, with regard to the part where the scanning lines 11a extend also, unnecessary capacitance coupling can be suppressed since the capacitance wirings 400 are formed in a lattice manner.

In the fourth layer, the third relay electrode 402 is formed of the same film as that of the capacitance wiring 400. The third relay electrode 402 has a function to relay the electrical connection between the second relay electrode 6a2 and the pixel electrodes 9a through contact holes 804 and 89 to be described below. The capacitance wiring 400 and the third relay electrode 402 are not formed in a manner of being contiguous with each other in a planar shape but formed so as to be separated form each other in the patterning.

Meanwhile, the capacitance wiring 400 and the third relay electrode 402 have a double-layer structure of an aluminum layer as a lower layer and a nitride titanium layer as an upper layer. Thus, the capacitance wiring 400 and the third relay electrode 402 include aluminum, which has a relatively superior light reflection ability, and a nitride titanium, which has a relatively superior light absorption ability. They therefore can function as a light shielding layer. Namely, according to this, incident light to the semiconductor layer 1a of the TFT 30 (refer to FIG. 6) can be interrupted above the semiconductor layer 1a.

Especially in the first embodiment, the pad 404P is formed in the peripheral area as shown in FIGS. 7 and 8. The pad 404P is formed of the same film as that of the capacitance wiring 400 and the third relay electrode 402 (they may be referred to as the capacitance wiring 400 and so on in all hereinafter). Thus, as with the capacitance wiring 400 and so on, the pad 404P has a double-layer structure of an aluminum layer as a lower layer and a nitride titanium layer as an upper layer. The pad 404P and the capacitance wiring 400 and so on are formed in a manner of being separated from each other in a patterning although they are formed of the same film.

The pad 404P constitutes a part of each connection terminal 102 for external circuit that has been described referring to FIGS. 1 and 2. Specifically, an opening 44H communicating with the pad 404P is formed in the fourth interlayer insulating film 44 to be described below that is formed over the pad 404P so as to expose the top surface of the pad 404P to outside, and thereby the connection terminal 102 for external circuit is formed. Especially in the first embodiment, the surface of the fourth interlayer insulating film 44 is planarized by implementing planarizing treatment such as CMP (Chemical Mechanical Polishing) treatment.

As the above, the surface of the pad 404P is exposed by opening the fourth interlayer insulating film 44 in the first embodiment. The smaller the thickness of the fourth interlayer insulating film 44 is, becomes the smaller the difference in level between the surface of the fourth interlayer insulating film 44 (it corresponds to one example of uppermost surface of stack structure in the invention) and that of the pad 404P, such that the generation of shavings during rubbing can be reduced. Referring to FIG. 8, the thickness of the fourth interlayer insulating film 44 is smaller than that of the third interlayer insulating film 43, while the surface of the fourth interlayer insulating film 44 is located at almost same level as that of the surface of the pad 404P.

Meanwhile, in regard to the height of stack structure of the peripheral area where the pad 404P is formed, namely the whole thickness from the substrate 10, the following feature is contrived, too. Beneath the pad 404P in FIG. 8, the third interlayer insulating film 43, the wiring 6aP, the second interlayer insulating film 42, a dummy storage capacitor 70P, the first interlayer insulating film 41, a dummy gate electrode 3aP, the underlayer insulating film 12, and a dummy scanning line 11aP are formed in this order from above.

Among these elements, the insulating films 43, 42, 41, and 12 are the same as those described in FIG. 6 (the same applies to the fourth interlayer insulating film 44). The dummy storage capacitor 70P, the dummy gate electrode 3aP, and the dummy scanning line 11aP are formed of the same films as those of the storage capacitor 70, the gate electrode 3a, and the scanning line 11a, respectively. For example, the dummy storage capacitor 70P has a multi-layered structure including elements each corresponding to the lower electrode 71, the capacitor electrode 300, and the dielectric film 75, which constitute the storage capacitor 70. Almost same applies to another elements. With regard to the thickness of each of elements such as interlayer insulating films and electrodes, the elements in the peripheral area has the same thickness as that of the elements in the image display area. Thus, if elements corresponding to the elements formed in the image display area 10a (namely, elements corresponding to the elements with numerals 6aP, 70P, 3aP, 11aP) are formed in the peripheral area also, adjustment for generally equalizing the whole height of a stack structure of the peripheral area and that of the image display area 10a, and so on, can be implemented.

The dummy scanning line 11aP and so on has almost same planar shape as that of the pad 404P as shown in FIG. 7. The dummy storage capacitor 70P, the dummy gate electrode 3aP, the dummy scanning line 11a, etc. all have the same shape (In FIG. 7, common numeral "DP" is given to the outer shape of the dummy scanning line 11aP and so on). Although the dummy gate electrode 3aP, the dummy storage capacitor 70P, and so on are formed of the same films as those of the gate electrode 3a, the storage capacitor 70, and so on, the both (namely, dummy elements in FIG. 8 and elements each corresponding to those in FIG. 6), however, are formed in a manner of being separated from each other in a patterning. The both therefore are not electrically connected to each other. The terms "gate electrode", "storage capacitor", and so on of the dummy gate electrode 3aP, the dummy storage capacitor 70P, and so on are used for indicating that the dummy elements are formed of the same films as those of the gate electrode 3a, the storage capacitor 70, and so on. These terms do not indicate that the dummy elements actually function as a gate electrode, an storage capacitor, and so on.

Meanwhile, the wiring 6aP among the above elements is formed of the same film as that of the data line 6a and contributes to the level adjustment of the pad 404P, as with the dummy gate electrode 3aP and so on. Besides, the wiring 6aP assumes a particular function in the first embodiment.

The wiring 6aP includes an aluminum layer (refer to numeral 41A in FIG. 6) and a nitride titanium layer (refer to numeral 41TN in FIG. 6) in this order from bottom, as with the data line 6a. Meanwhile, with regard to the nitride silicon film layer (refer to numeral 401 in FIG. 6), it is removed with patterning treatment (photolithography process and etching process) after the precursor film thereof is formed. The wiring 6aP is electrically connected to the pad 404P through contact holes 43H formed in the third interlayer insulating film 43.

Thus, the wiring 6aP assumes a function to transmit signals sent from various external circuits connected to the connection terminals 102 for external circuit and the pad 404P, which is a part of the connection terminal 102, to various elements (for example, the TFTs 30) constituting the electro-optical device. Accordingly, some of the wiring 6aP that correspond to any of the plurality of connection terminals 102 for external circuit shown in FIG. 1 are formed so that data lines 6a can electrically be connected thereto.

Especially in the first embodiment, the disposition relationship between the contact holes 43H and the opening 44H is determined as below. The pad 404P is formed in a generally quadrate shape when viewed from above as shown in FIG. 7. The opening 44H is formed so that the shape thereof when viewed from above is generally similar to that of the pad 404P. The area of the former, however, is larger than that of the latter. Namely, the opening area of the opening 44H is smaller than the area of the pad 404P. Meanwhile, the plurality of contact holes 43H is formed in a manner of surrounding the opened portion of the opening 44H and along the circumference shape of the pad 404P.

The contact holes 43H are preferably formed at the same time as the contact holes 803 and 804 are formed. The opening 44H is preferably formed at the same time as the contact hole 89 is formed.

Over the data lines 6a, and under the capacitance wiring 400 and the pad 404P, formed is the third interlayer insulating film 43 that is composed of, for example, a film of silicate glass such as NSG, PSG, BSG, and BPSG, a nitride silicon film, and an oxide silicon film, or is preferably formed by a plasma CVD method employing TEOS gas. In the third interlayer insulating film 43, the contact hole 803 for electrically interconnecting the capacitance wiring 400 and the relay layer 6a1 for capacitance wiring is formed, and the contact hole 804 for electrically interconnecting the third relay electrode 402 and the second relay electrode 6a2 is formed.

The pixel electrodes 9a are formed in a matrix on the sixth layer, and the alignment film 16 is formed over the pixel electrodes 9a. Under the pixel electrodes 9a, formed is the fourth interlayer insulating film 44 that is composed of a film of silicate glass such as NSG, PSG, BSG, and BPSG, a nitride silicon film, an oxide silicon film, and the like, or is preferably composed of a NSG. In the fourth interlayer insulating film 44, formed is the contact hole 89 for electrically interconnecting the pixel electrode 9a and the third relay electrode 402. As a result, the pixel electrode 9a and the TFT 30 are electrically connected to each other through the contact hole 89, the third relay layer 402, the contact hole 804, the second relay layer 6a2, the contact hole 882, the relay electrode 719, the contact hole 881, the lower electrode 71, and the contact hole 83. The surface of the fourth interlayer insulating film 44 is planarized by implementing planarizing treatment such as CMP treatment as described above so as to reduce orientation defect of the liquid crystal layer 50 that is caused by step formed of various kinds of wiring and elements existing beneath the fourth interlayer insulating film 44.

The alignment film 16 is formed above the pad 404P. When a terminal of a FPC (Flexible Printed Circuit) substrate is coupled to the pad 404P, the terminal of the FPC substrate bursts through the alignment film 16, ensuring electrical connection. This electrical connection is preferably established with a method using an ACF (Anisotropic Conductive Film). Otherwise, the alignment film 16 may be removed at least after the TFT array substrate 10 is joined to the counter substrate 20, and before the FPC substrate is pressure-bonded to be fixed.

According to the electro-optical device of the first embodiment having the above structure, the following advantageous effects are achieved, especially in regard to the pad 404P and the connection terminals 102 for external circuit and so on, which have been described as the structure of the fifth layer.

First, the surface of the pad 404P is positioned as almost same level as that of the surface of the fourth interlayer insulating film 44 even though the level difference due to the thickness of the fourth interlayer insulating film 44 exists. Thus, even if the alignment film 16 is formed above such a structure, concern that steep concavity and convexity are formed in the alignment film 16 corresponding to the formation area of the connection terminal 102 for external circuit (refer to FIG. 8). According to the first embodiment, therefore, the generation of shavings due to the concavity and convexity can be prevented when rubbing is implemented for the alignment film 16. Furthermore, this enables higher quality image to be displayed.

Such advantageous effects are assisted by the following structures and so on in the first embodiment especially. First, the pad 404P in the first embodiment is formed of the same film as that of the capacitance wiring 400, and the capacitance wiring 400 is formed just beneath the pixel electrode 9a (namely, with interposing only the fourth interlayer insulating film 44) as shown in FIG. 6. Accordingly, the pad 404P is also formed on the layer just beneath the pixel electrode 9a in the stack structure as shown in FIG. 8 such that the surfaces of the pad 404P and the fourth interlayer insulating film 44 can more adequately be positioned at the same level. Second, in the first embodiment, various kinds of dummy films such as dummy scanning line 11aP are formed beneath the pad 404P, and thereby the pad 404P can be positioned at higher level in the stack structure for the inherent "height" of the dummy films. Without the dummy films, the thickness of the interlayer insulating film 44 should be increased for the thickness of the dummy films in order to planarize the interlayer insulating film 44 from the pixel region to the peripheral region. Thus, the difference in level between the surfaces of the pad 404P and the fourth interlayer insulating film 44 becomes large. According to the first embodiment, the surfaces of the pad 404P and the fourth interlayer insulating film 44 can more adequately be positioned at same level. As a result, the following advantageous effects are more surely achieved steps are not generated in the alignment film 16, the extent of rubbing can be kept constant when rubbing is implemented for the alignment film 16, and shavings of the alignment film 16 are not generated.

The second advantageous effect achieved by the electro-optical device of the first embodiment is that various signals supplied from external to the pad 404P can stably be supplied to the TFTs 30 and so on through the wiring 6aP since the connection terminal 102 for external circuit and the surrounding thereof have a structure where the opening 44H, the pad 404P, the contact hole 43H, and the wiring 6aP are formed in this order from above in FIG. 8. The pad 404P is formed on a higher layer in the stack structure as shown in FIG. 8, while the TFTs 30 and so on a lower layer in the stack structure as shown in FIG. 6. A relatively deep contact hole therefore needs to be formed in order to directly interconnect them. In the first embodiment, however, the contact hole 43H is a relatively shallow contact hole since the dummy scanning line 11aP, the dummy gate electrode 3aP, and the dummy storage capacitor 70P exist. Especially in the case where the surface of the third interlayer insulating film 43 is planarized, if these dummy films do not exist, the thickness of the interlayer insulating film 43 increases for the total thickness of the dummy films such that the depth of the contact hole 43H becomes larger. In the first embodiment, the electrical connection between the pad 404P and the wiring 6aP can be established with the contact hole 43H that is relatively shallow, and the electrical connection between the wiring 6aP and the TFT 30 can be established with another relatively shallow contact hole. Signals therefore can stably be supplied from the pad 404P to the TFT 30 and so on. Especially, since such a relatively deep contact hole is not required, achieved is a great advantageous effect that the manufacturing time of the electro-optical device can be shortened.

Third, the following advantageous effect is achieved owing to the disposition relationship between the openings 44H and 43H, and the pad 404P. Namely, in the first embodiment, as shown in FIG. 7, the structure is realized where the exposed surface of the pad 404P corresponding to the opened shape of the opening 44H exists, and the contact holes 43 are formed surrounding the periphery of the exposed surface, and furthermore the peripheral part of the pad 404P exists to surround the outer circumference of the contact holes 43, in this order from above. According to such a structure, in the case where wet etching is utilized for forming the opening 44H, concern that the used etchant reaches the contact hole 43H so as to cause a damage such as breaking can extremely be reduced.

Figure 9A:
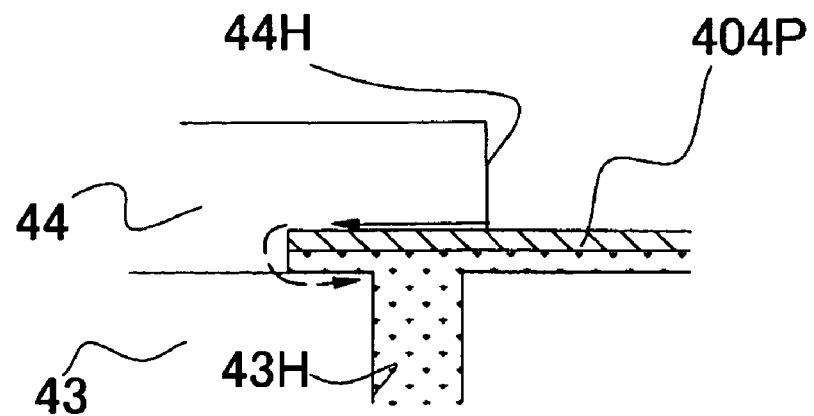
FIG. 9(a) shows an electro-optical device of a first embodiment, and FIG. 9(b) a comparative example thereof.
Figure 9B:
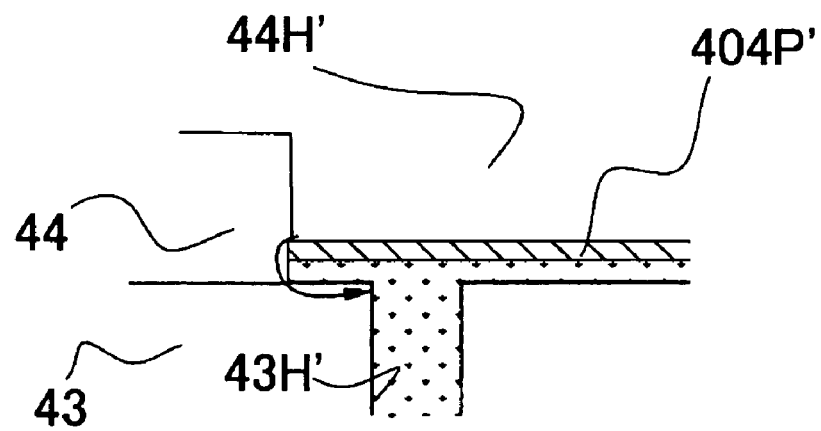
FIG. 9 is a sectional view having the same purpose as that of FIG. 8, and especially is a diagram showing the disposition relationship of an opening 44H, a pad 404P, and a contact hole 43H.

Such advantageous effects will be described using an explanatory diagram of FIG. 9. FIG. 9 is a sectional view having the same purpose as that of FIG. 8, and especially is a diagram showing the disposition relationship of the opening 44H, the pad 404P, and the contact holes 43H. FIG. 9(a) shows the electro-optical device of the first embodiment, and FIG. 9(b) a comparative example thereof.

First, referring to FIG. 9(b) showing a comparative example, the opening area of the opening 44H' is the same as the area of the pad 404P', and the contact holes 43H' are formed along the peripheral part of the pad 404P'. In such a structure, when wet etching is utilized for forming the opening 44H', the etchant passes through from the corner of bottom of the opening 44H' and along a side surface of the pad 404P' (the both exist on the common surface) so as to easily reach the contact hole 43H'. In this case, therefore, concern that the contact hole 43H' corrodes with the etchant is extremely large, and possibility that damage, such as breaking is caused is also large.

In the first embodiment, as shown in FIG. 9(a), the area of the opening 44H is smaller than that of the pad 404P, and the contact holes 43H are formed along the peripheral part of the pad 404P. According to this, the path length of the etchant passing through from the corner of bottom of the opening 44H to reach the contact hole 43H is extremely lengthened compared to the previous example. Namely, in this case, the etchant needs to pass through on the surface of the pad 404P from the side surface of the opening 44H to the edge of the pad 404P in order to reach the contact hole 43H (refer to a full line arrowhead in FIG. 9(a)). Thus, in the first embodiment, the pad 404P functions as a so-called stopper for the etchant such that the situation where the etchant reaches the contact hole 43H (refer to a dashed line arrowhead in FIG. 9(a)) is hardly caused.

In the first embodiment, therefore, even in the case where wet etching is implemented in forming step of the opening 44H and so on, concern that the etchant used for the wet etching reaches the contact hole 43H so as to cause a damage such as breaking thereof can extremely be reduced. Conversely, if the structure according to the first embodiment is adopted, the electrical connection between the pad 404P and the wiring 6aP can more surely be established.

Figure 10:
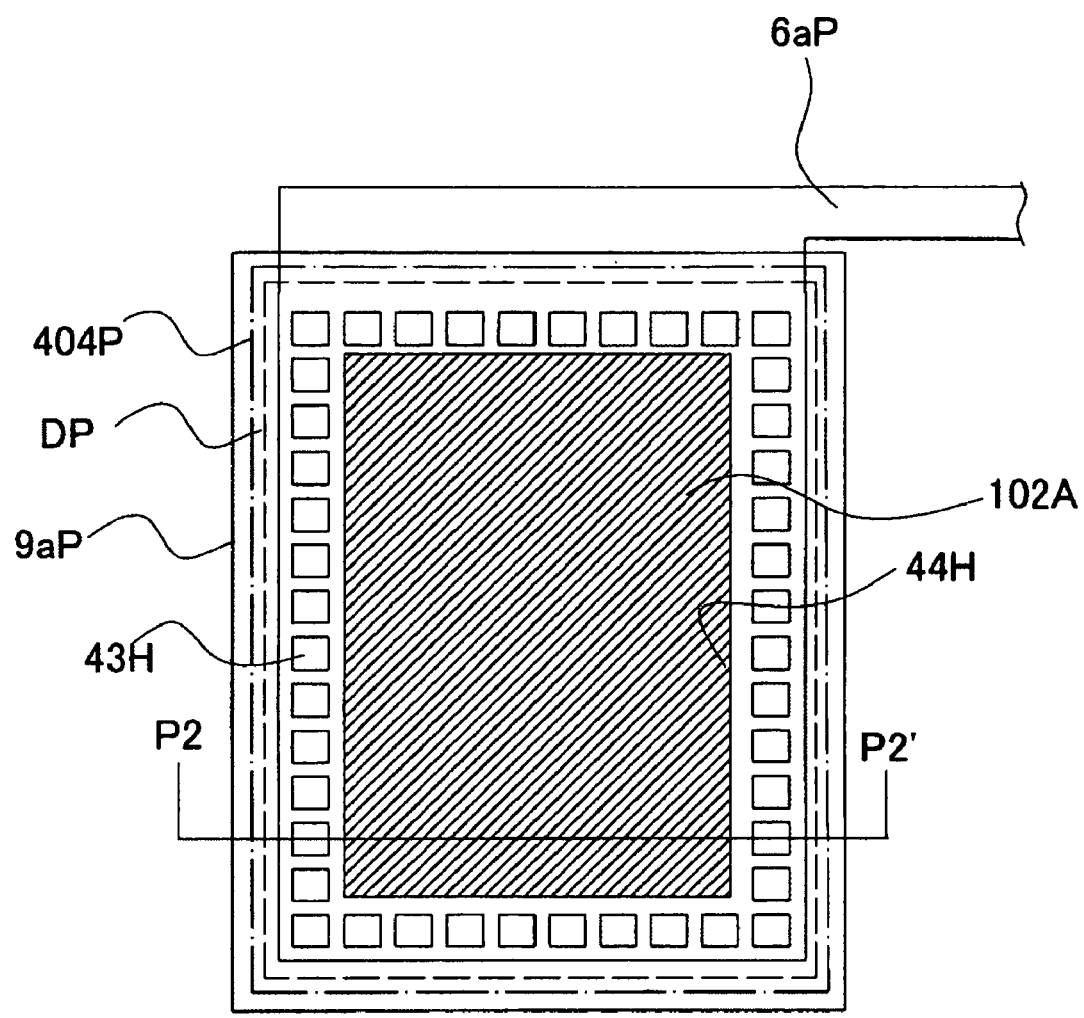
FIG. 10 is a plan view according to a second embodiment of the invention that has the same purpose as that of FIG. 7 but is different from FIG. 7 in that a controlling film 9aP is formed.
Figure 11:
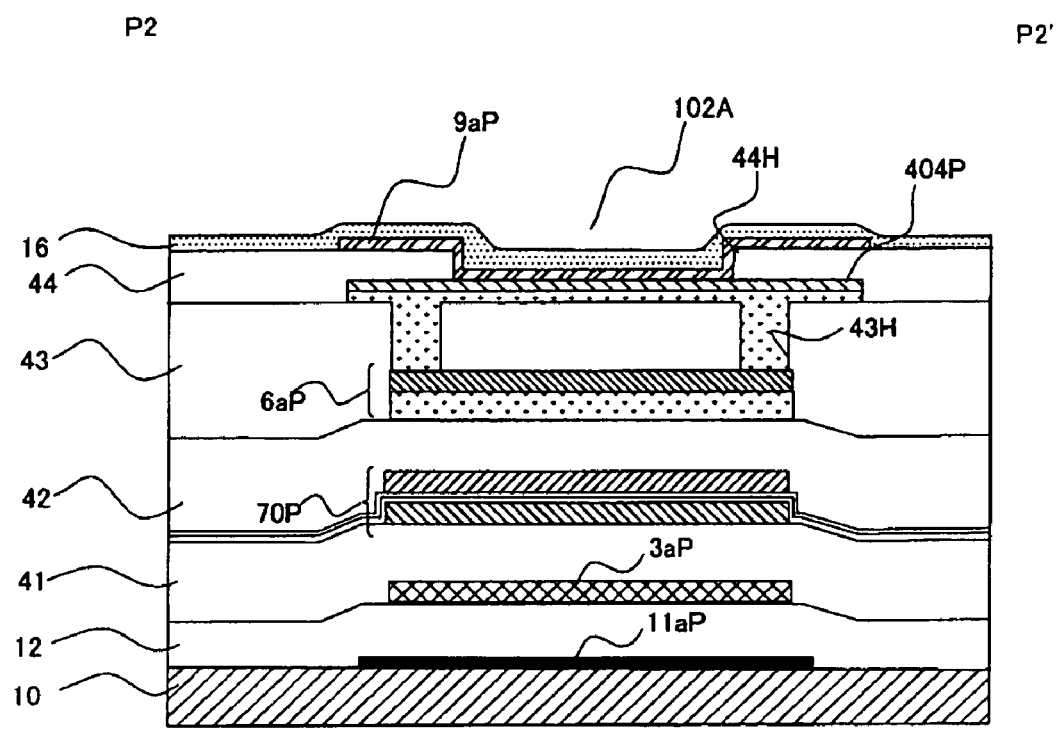
FIG. 11 is a sectional view along P2-P2' line of FIG. 10.

A second embodiment of the invention will be described referring to FIGS. 10 and 11. Although FIGS. 10 and 11 are diagrams having the same purposes as those of FIGS. 7 and 8, respectively, but are different therefrom in that a thickness controlling film 9aP (it is simply referred to as controlling film 9aP hereinafter) formed of the same film as that of the pixel electrode is formed. FIG. 10 is a plan view, and FIG. 11 is a sectional view of P2-P2' line of FIG. 10. The second embodiment includes many same features as those of the above "electro-optical device" in regard to the structure and operation (especially, the structure of the pixel unit and so on). The description about these features therefore will be omitted, and explanation will be added in regard to only features that are distinguishing in the second embodiment. The same numerals as those of FIGS. 7 and 8 are used for FIGS. 10 and 11 as long as they indicate elements that are not essentially different from those shown in FIGS. 7 and 8.

In the second embodiment, each of connection terminals 102A for external circuit includes the controlling film 9aP formed of the same film as that of the pixel electrodes 9a as shown in FIGS. 10 and 11. The controlling film 9aP is formed in a manner of covering the whole of the opening 44H, namely covering the whole of the pad 404P.

It is clear that, in the second embodiment also, the same advantageous effects as those of the first embodiment are achieved in a generally same way. Besides, in the second embodiment especially, the controlling film 9aP is formed such that the surfaces of the connection terminals 102A for external circuit and the fourth interlayer insulating film 44 can be positioned at almost same level by utilizing the thickness of the dummy pixel electrode 9aP.

In the first embodiment, the alignment film 16 deposited on the top layer of the stack structure should be directly brought into contact with the pad 404P, while in the second embodiment, the alignment film 16 is brought into contact with the controlling film 9aP (refer to FIG. 11). In the case where the pad 404P includes, for example, aluminum as described above, it is contemplated that the adhesion between the pad 404P and the alignment film 16 is inferior to that between the controlling film 9a and the alignment film 16. Conversely, the adhesion for the alignment film 16 can be improved in the second embodiment. According to the second embodiment, therefore, the generation of shavings of the alignment film 16 when implementing rubbing for the alignment film 16 can be further prevented.

The alignment film 16 is shown in FIG. 11. As with the first embodiment, when a terminal of a FPC substrate is coupled to the pad 404P, the terminal of the FPC substrate breaks through the alignment film 16, ensuring electrical connection. The alignment film 16 is removed by implementing O₂ plasma treatment before pressure-bonding the FPC substrate to fix it. The same applies to the following embodiments.

Figure 12:
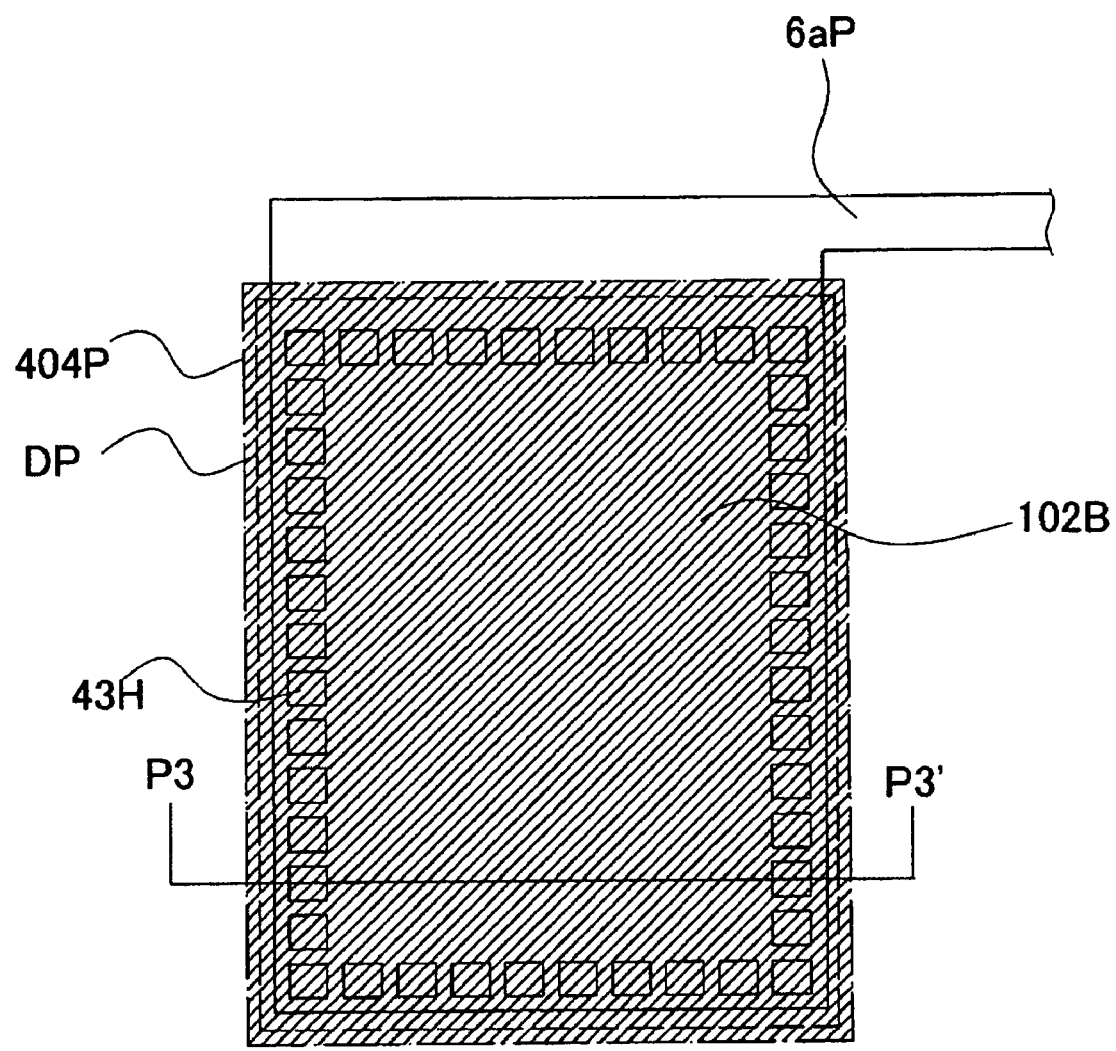
FIG. 12 is a plan view according to a third embodiment of the invention that has the same purpose as that of FIG. 7 but is different from FIG. 7 in that the whole surface of the pad is exposed.
Figure 13:
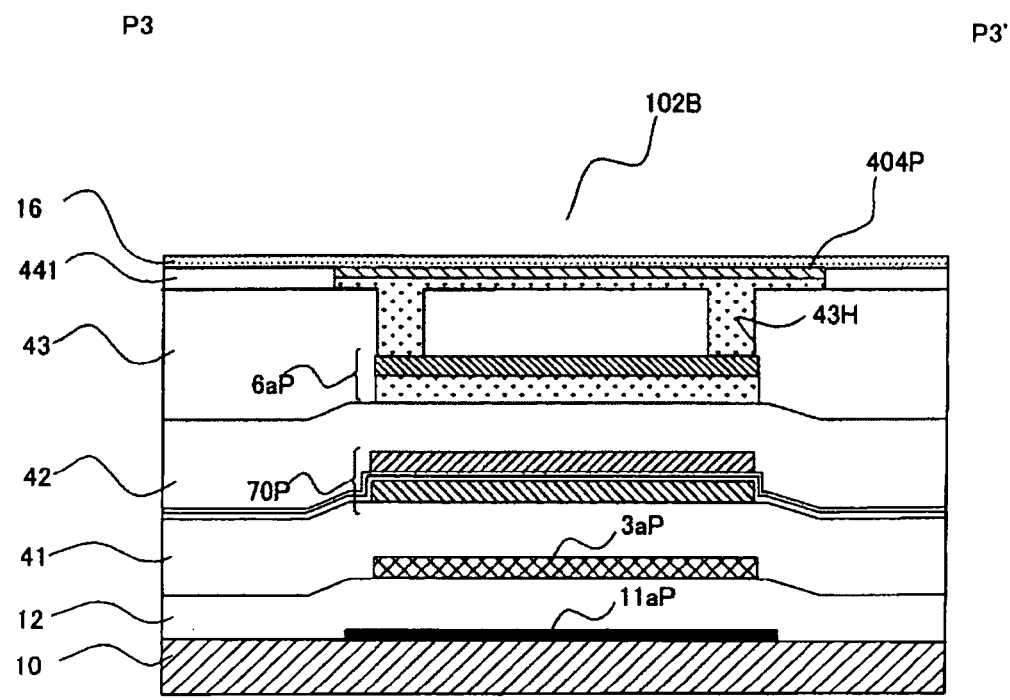
FIG. 13 is a sectional view along P3-P3' line of FIG. 12.

A third embodiment of the invention will be described referring to FIGS. 12 and 13. FIGS. 12 and 13 are diagrams having the same purposes as those of FIGS. 7 and 8, respectively, but are different from them in that the whole surface of the pad 404P is exposed. FIG. 12 is a plan view, and FIG. 13 is a sectional view of P3-P3' line of FIG. 12. The third embodiment includes many same features as those of the above electro-optical device, especially in regard to the structure of the pixel unit. The description about these features therefore will be omitted, and explanation will be added in regard to only features that are distinguishing in the third embodiment. The same numerals as those of FIGS. 7 and 8 are used for FIGS. 12 and 13 as long as they indicate elements that are not essentially different from those shown in FIGS. 7 and 8.

In the third embodiment, as shown in FIGS. 12 and 13, the fourth interlayer insulating film over the pad 404P is eliminated, and only a fourth interlayer insulating film 441 remains at the sides of the pad 404P. Accordingly, the opening 44H, which is shown in FIG. 8 and so on, does not exist. Thus, the connection terminals 102B for external circuit do not have a structure where the pad 404P is exposed from the opening 44H but have a structure the pad 404P itself is located at the top layer of the stack structure to be exposed to outside. Such a structure can be manufactured by carrying forward planarizing treatment, such as CMP treatment, for the formation area of the pad 404P.

It is clear that, in the third embodiment also, the same advantageous effects as those of the first embodiment are achieved in a generally same way. Besides, especially in the third embodiment, the area of the connection terminal 102B for external circuit has almost completely planarity as is apparent from the drawing. Accordingly, situation where shavings of the alignment film 16 are generated due to rubbing for the alignment film 16, and so on can more surely be avoided. In the case where CMP treatment is utilized as described above to realize the structure shown in FIG. 13, the pad 404P can be utilized for detection of ending point of the CMP treatment. Namely, the time when CMP treatment is completed can be determined based on whether the pad 404P is exposed or not such that special features for detection of ending point are unnecessary, leading to advantage in manufacturing.

In the third embodiment, the following consideration is preferably given for the pixel unit shown in FIG. 6. Namely, in the third embodiment, the capacitance wiring 400, which is formed of the same film as that of the pad 404P, is also exposed to outside since the fourth interlayer insulating film 44 over the pad 404P is eliminated. This, however, gives rise to the possibility that short-circuit between the pixel electrode 9a and the capacitance wiring 400 is caused when the pixel electrodes 9a are formed over the structure (refer to the pixel electrode 9a over the edge part of the capacitance wiring 400 in the left side of FIG. 6).

Figure 14:
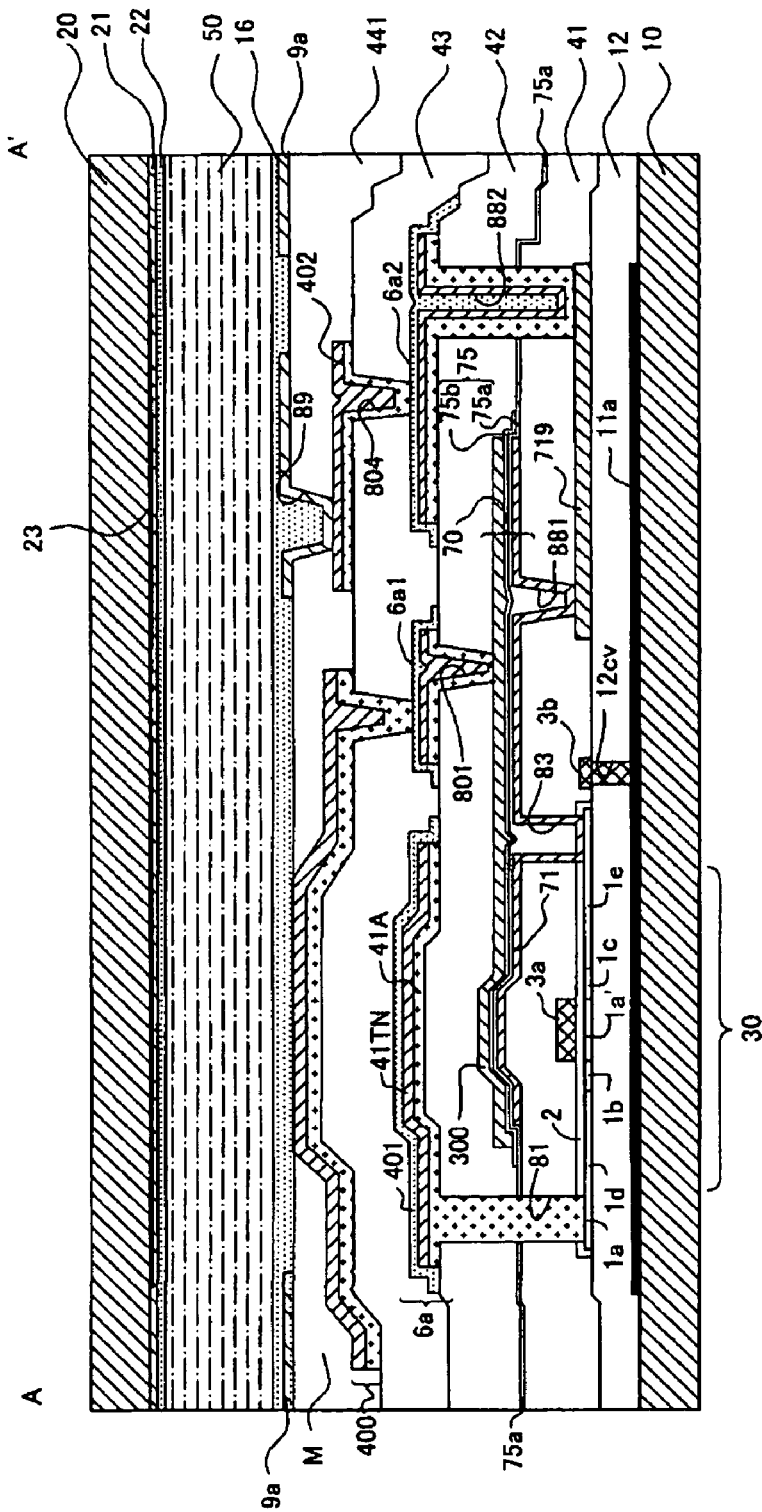
FIG. 14 is a sectional view according to the third embodiment of the invention that has the same purpose as that of FIG. 6 and shows a preferable structural example of the stack structure in a pixel unit.

In the pixel unit according to the third embodiment, therefore, steps due to various elements are preferably left as shown in FIG. 14 for example, instead of implementing planarizing treatment for the third interlayer insulating film 43 and so on beneath the capacitance wiring 400, and implementing planarizing by burying the data line 6a and so on. According to this, although the capacitance wiring 400 is also exposed to outside if CMP treatment and so on is implemented for the fourth interlayer insulating film 44 in order to expose the pad 404P to outside, short-circuit between the capacitance wiring 400 and the pixel electrode 9a can be avoided since the part related to exposure of the capacitance wiring 400 mainly exists in only place keeping out of the pixel electrodes 9a in a plan view. In this case, the capacitance wiring 400 and the pixel electrode 9a are preferably formed in a manner of not overlapping with each other completely in a plan view instead of overlapping with each other in a plan view. Specifically, the capacitance wiring 400 is preferably formed so that the width thereof is a bit smaller than that shown in FIG. 5. Even if the portion overlapping with each other in a plan view exists, however, short-circuit between the capacitance wiring 400 and the pixel electrode 9a may be not caused in some cases as shown by numeral M in FIG. 14.

Figure 15:
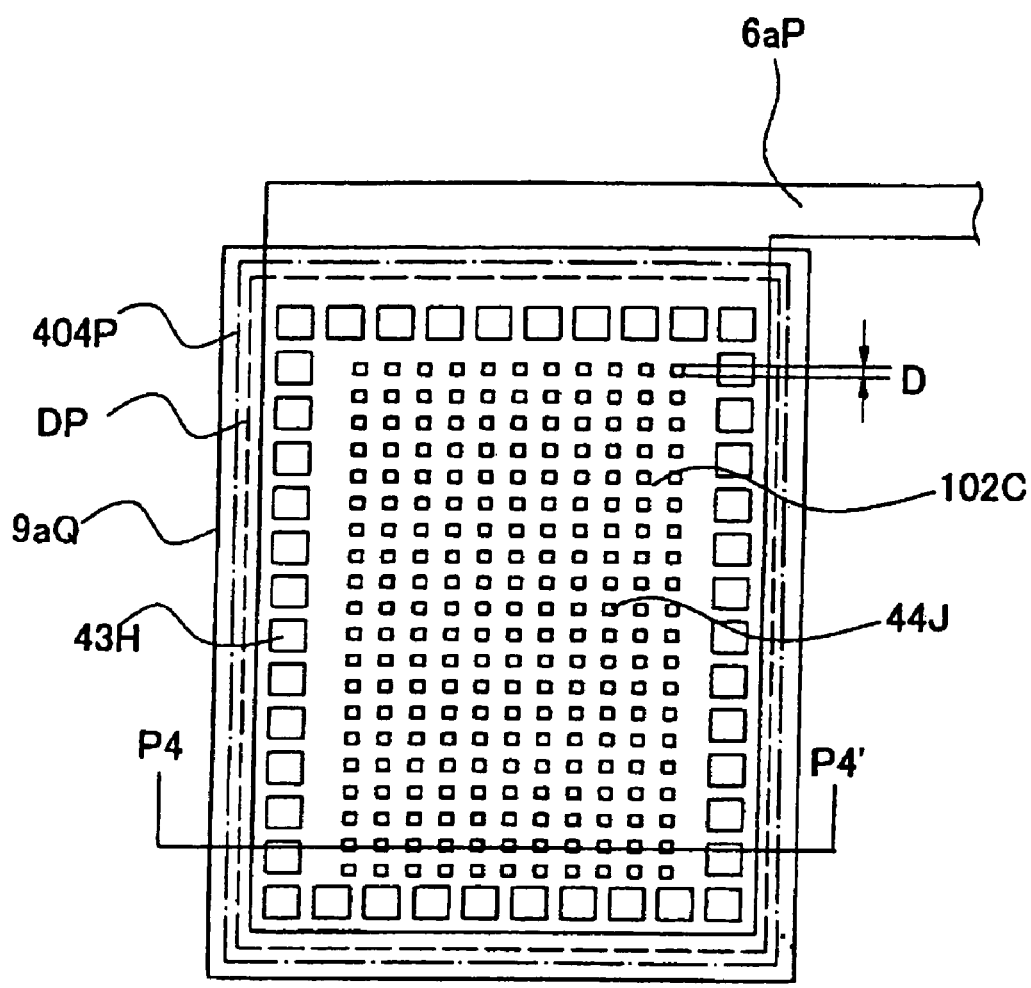
FIG. 15 is a plan view according to a fourth embodiment of the invention that has the same purpose as that of FIG. 7 but is different from FIG. 7 in the form of a contact hole formed in a fourth interlayer insulating film.
Figure 16:
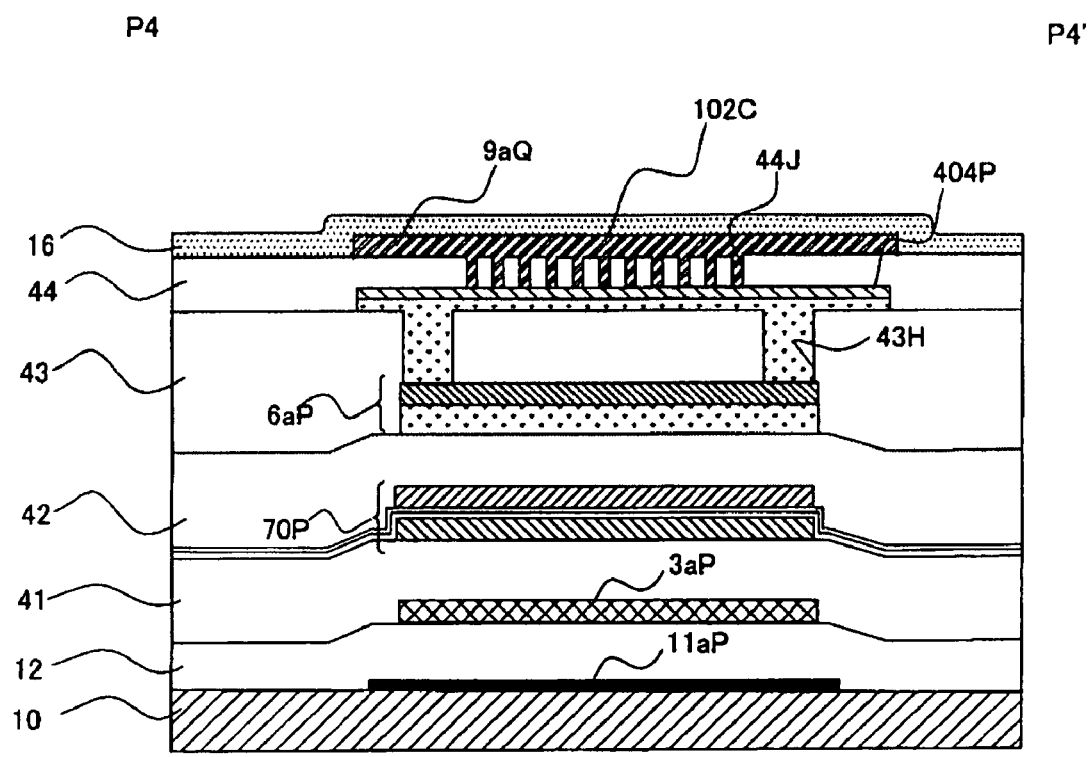
FIG. 16 is a sectional view along P4-P4' line of FIG. 15.
Figure 17:
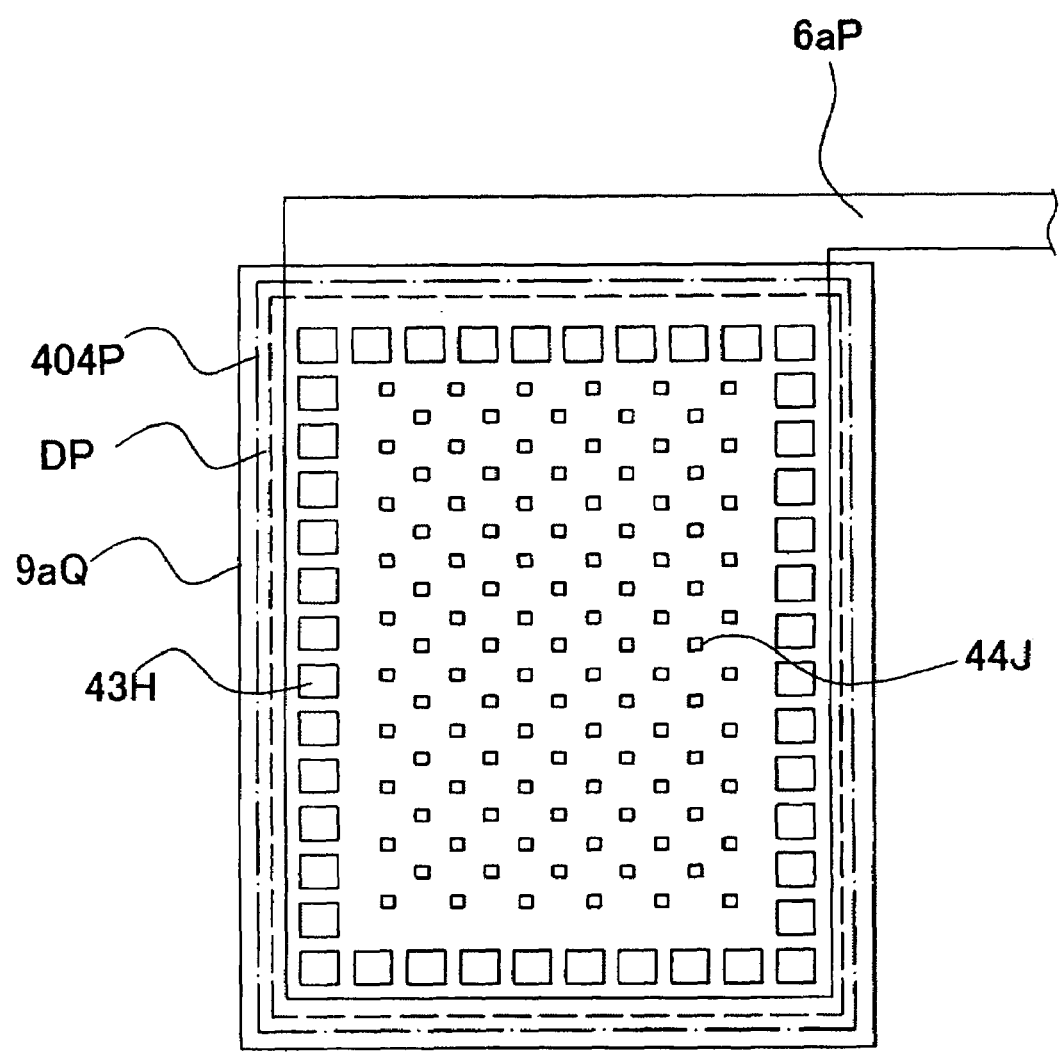
FIG. 17 is a plan view showing a modified formation in relation to FIG. 15.

A fourth embodiment of the invention will be described referring to FIGS. 15 through 18. FIGS. 15 and 16 are diagrams having the same purposes as those of FIGS. 7 and 8, respectively, but are different from them in the form of contact holes formed in the fourth interlayer insulating film 44. FIG. 15 is a plan view, and FIG. 16 is a sectional view of P4-P4' line of FIG. 16. FIG. 17 shows a deformation form of FIG. 15, and FIG. 18 a deformation form of FIG. 16. The fourth embodiment includes many same features as those of the above electro-optical device (in regard to the structure of the pixel unit). The description about these features therefore will be omitted, and explanation will be added in regard to only features that are distinguishing in the fourth embodiment. The same numerals as those of FIGS. 7 and 8 are used for FIGS. 15 through 18 as long as they indicate elements that are not essentially different from those shown in FIGS. 7 and 8.

In the fourth embodiment, as shown in FIGS. 15 and 16, each of connection terminals 102C for external circuit includes contact holes 44J having a relative small opening area instead of the opening 44H in FIG. 8 and so on. A plurality of contact holes 44J is formed in a manner of being dispersed evenly, specifically in a matrix, within the formation area of the pad 404P as shown in FIG. 15. In the fourth embodiment, opening diameters D of the contact holes 44J at the top surface of the fourth interlayer insulating film 44 are the same, and are 5 micro meters or less for example. The shape thereof is a square or circular shape. The contact holes 44J may be formed using only dry etching or wet etching, or may be formed using combination of dry and wet etching.

In the fourth embodiment, on the premise of the above structure, a thickness controlling film 9aQ (it is simply referred to as controlling film 9aQ hereinafter) formed of the same film as that of the pixel electrodes 9a is formed over the pad 404P as with the second embodiment, in a manner of filling the contact holes 44J. The controlling film 9aQ corresponds to one example of conductive film in the third electro-optical device of the invention.

In the fourth embodiment, for example, compared to the case where the opening area of the opening 44H is almost equal to the area of the pad 404P (refer to FIGS. 10 and 11 for example), the controlling film 9aQ hardly drops down toward the bottom of the contact holes 44J. Namely, in such a structure, the contact holes 44J play a so-called pillar-like role in the relation with the controlling film 9aQ formed over the fourth interlayer insulating film 44, and thereby the level of the surface of the controlling film 9aQ can nearly be equalized to that of the fourth interlayer insulating film 44. Accordingly, even if the alignment film 16 is formed over the structure (namely, over the controlling film 9aQ), concern that concavity and convexity are formed in the surface of the alignment film 16 is further reduced, such that possibility that shavings of the alignment film 16 are generated due to rubbing for the alignment film 16 is extremely reduced.

In the fourth embodiment also, in the case where wet etching is implemented for forming the contact holes 44J, the same advantageous effect as that described with reference to FIG. 9 in the first embodiment is achieved. The reason is that the contact holes 44J according to the fourth embodiment are also formed inside the formation area of the second contact hole 43H as with the opening 44H.

In the fourth embodiment especially, such advantageous effects can more surely be achieved since the contact holes 44J are dispersed in a matrix, and the opening diameters D of the contact holes 44J are 5 micro meters or less. Because such a structure enables the contact holes 44J to play the pillar-like role more effectively.

Figure 18:
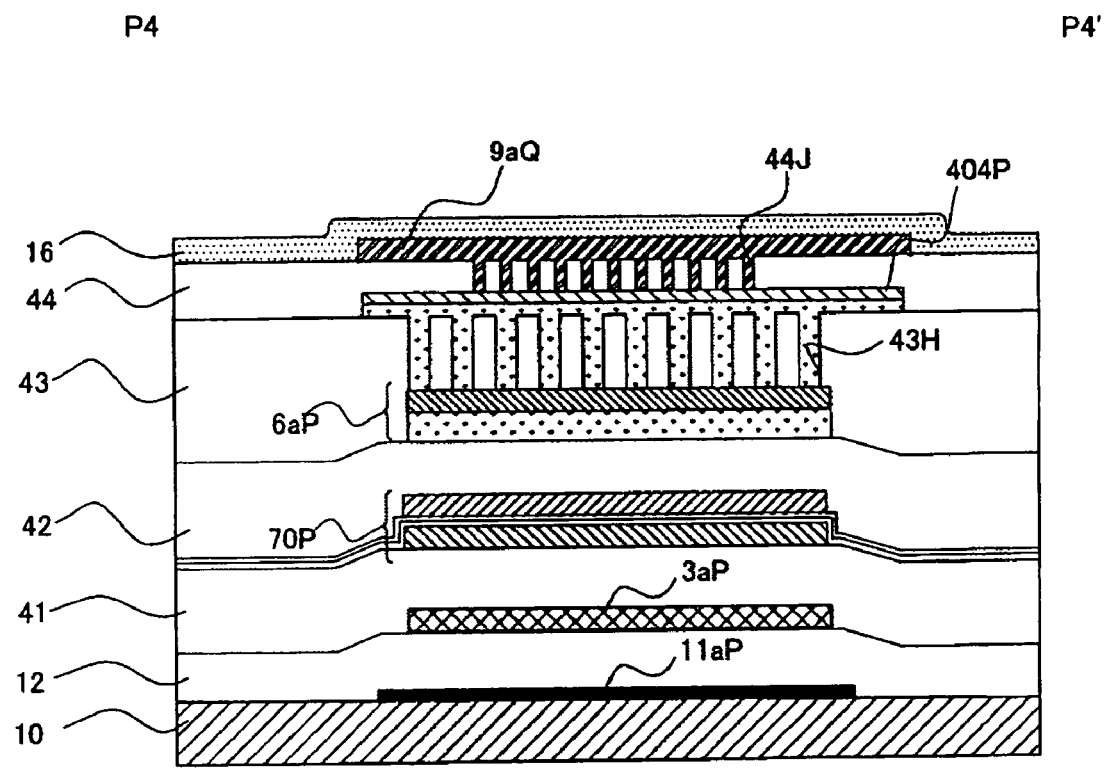
FIG. 18 is a plan view showing a modified formation in relation to FIG. 16.

With regard to the fourth embodiment, the invention can adopt various forms different from those of FIGS. 15 and 16. For example, the contact holes 44J may be dotted checker-wise as shown in FIG. 17, or may be dotted in a line or lattice manner. Otherwise, the contact holes 44J may be dotted in a quadrate manner along inside of the contact holes 43H. It is only necessary for the contact holes 44J to lower contact resistance, the number of contact holes therefore is preferably decreased to the utmost. Although in the above, only contact holes formed over the pad 404P are dotted within the range of the formation area of the pad 404P, the same concept may also be applied to contact holes for electrically interconnecting the pad 404P and the wiring 6aP as shown in FIG. 18. Namely, in this structure, contact holes 43J electrically interconnecting the pad 404P and the wiring 6aP instead of the contact holes 43H in FIG. 8 and so on are formed. The contact holes 43J are formed in a manner of being dotted within the range of formation area of the pad 404P. According to such a structure, in the relation between the third interlayer insulating film 43 and the pad 404P formed over the third interlayer insulating film 43 also, almost same advantageous effects as those obtained in the relation between the fourth interlayer insulating film 44 and the controlling film 9aQ can be achieved.

Figure 19:
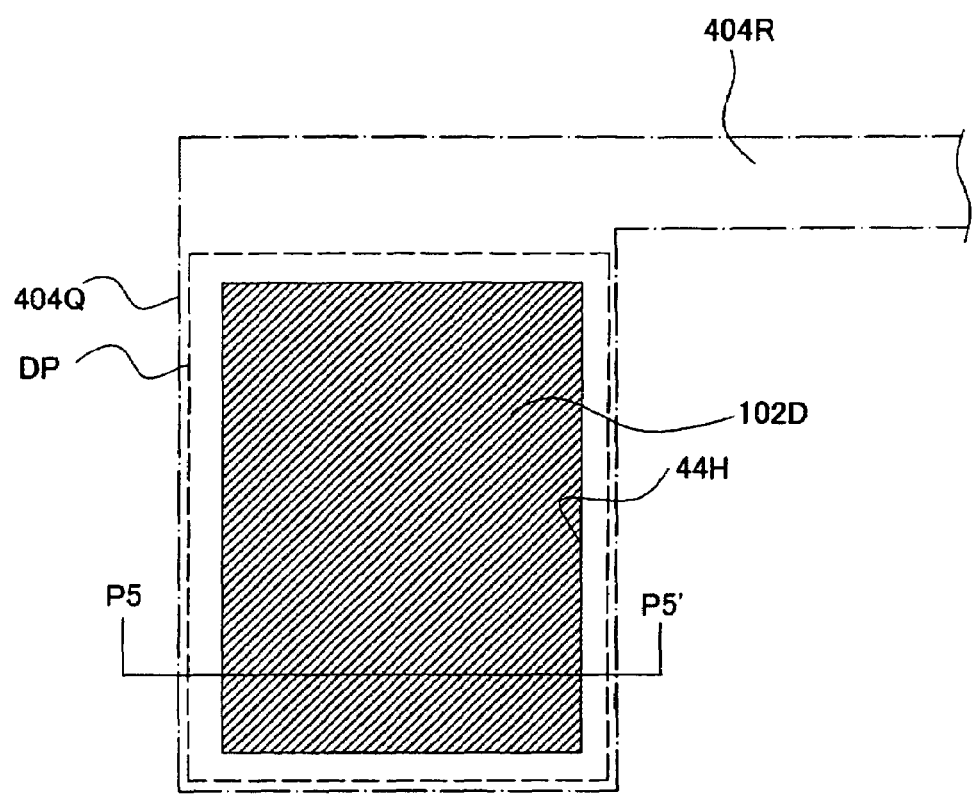
FIG. 19 is a plan view according to a fifth embodiment of the invention that has the same purpose as that of FIG. 7, but is different from FIG. 7 in that a contact hole is not formed in a third interlayer insulating film.
Figure 20:
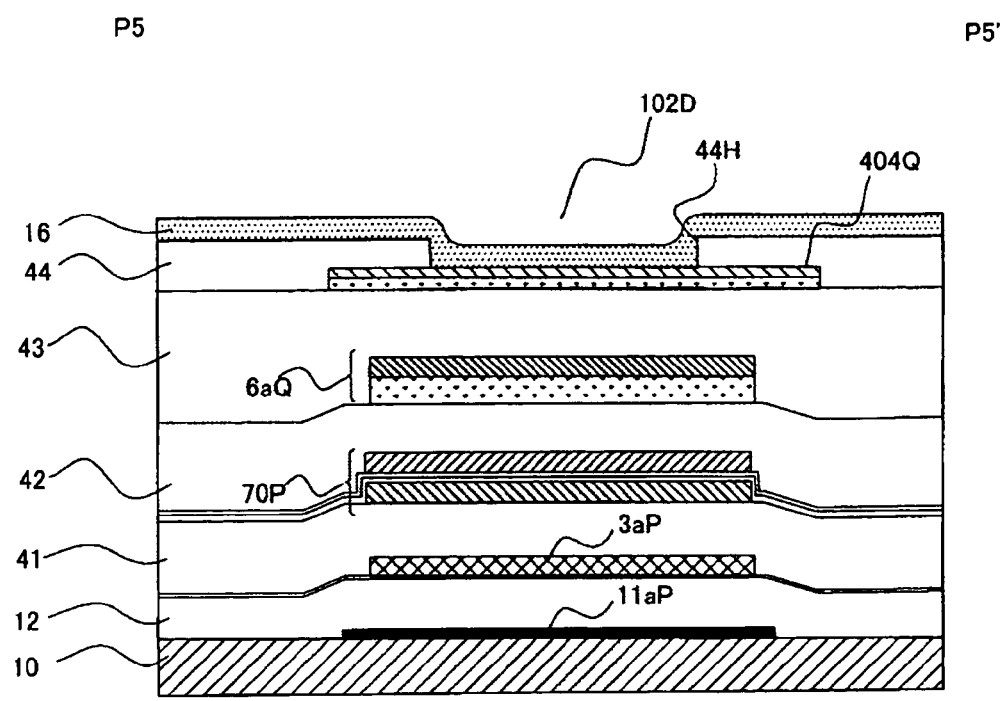
FIG. 20 is a sectional view along P5-P5' line of FIG. 19.

A fifth embodiment of the invention will be described referring to FIGS. 19 and 20. FIGS. 19 and 20 are diagrams having the same purposes as those of FIGS. 7 and 8, respectively, but are different from them in that the contact holes 43H are not formed in the third interlayer insulating film 43. FIG. 19 is a plan view, and FIG. 20 is a sectional view of P5-P5' line of FIG. 19. The fifth embodiment includes many same features as those of the above electro-optical device, especially in regard to the structure of the pixel section. The description about these features therefore will be omitted, and explanation will be added in regard to only features that are distinguishing in the fifth embodiment. The same numerals as those of FIGS. 7 and 8 are used for FIGS. 19 and 20 as long as they indicate elements that are not essentially different from those shown in FIGS. 7 and 8.

In the fifth embodiment, as shown in FIGS. 19 and 20, each of connection terminals 102D for external circuit does not include the contact holes 43H, which are formed between the wiring 6aP and the pad 404P in FIG. 8 and so on. In FIGS. 19 and 20, therefore, wiring (6aP) does not exist, instead a dummy data line 6aQ exists. Specifically, in FIGS. 19 and 20, although the dummy data line 6aQ formed of the same film as that of the data line 6a exists, signals are not sent to the dummy data line 6aQ from a pad 404Q. The dummy data line 6aQ in this case therefore does not have a function as wiring although it is an element for increasing height in the stack structure of the pad 404Q as with the dummy scanning line 11aP and so on.

Alternatively, the pad 404Q plays a role of the wiring 6aP in the fifth embodiment. Namely, as shown in FIG. 19, wiring 404R extending toward the right direction in the drawing is extended from the pad 404Q. The wiring 404R, which is not shown in the drawings hereinafter, is electrically connected to the data line 6a, the TFT 30, and so on, which are formed in the image display area 10a, eventually. Besides, the wiring 404R can be extended to the capacitance wiring 400 connecting to the storage capacitor 70 electrically connected to the pixel electrode 9a and the TFT 30 as is clear from comparison with FIG. 6. In the fifth embodiment, not only that the pad 404Q and the wiring 404R are formed of the same film as that of the capacitance wiring 400 (on this point, same as the previous embodiments), but also that at least some of the pads 404Q and the wirings 404R (at least some is based on the premise that a plurality of connection terminals 102D for external circuit exists (a plurality of pads 404Q exists) (refer to FIG. 1)) are extended and electrically connected to the capacitance wirings 400.

In the fifth embodiment, there is no need to utilize the contact holes 43H and so on for electrically interconnecting a pad and wiring unlike the previous embodiments. In the fifth embodiment, therefore, when signals are supplied to the wiring 404R and the capacitance wiring 400 from the pad 404Q, the signals can stably be supplied without disadvantage that the signals are weakened by the resistance of the contact holes 43H, and so on. Especially in the case where the capacitance wiring 400 to be connected or extended to the capacitor electrode 300 (refer to FIG. 6) is formed of the same film as that of the pad 404Q included in the connection terminal 102D for external circuit, and is extended to the pad 404Q, as the fifth embodiment, stable capacitance potential can be supplied to the capacitance wiring 400 and thus the capacitor electrode 300. The capacitance potential is generally set to a given constant value. This extremely reduces concern that horizontal cross-talk is caused on images due to fluctuation of the capacitance potential, and so on.

In the invention, the fifth embodiment and the above first through fourth embodiments can be realized in one electro-optical device. Namely, a plurality of connection terminals for external circuit is provided generally as shown in FIG. 1. Some of the terminals may employ the structure of the fifth embodiment and others may employ the structure of any of the first through fourth embodiments.

In the above embodiments, the structure related to the pad 404P and so on included in the connection terminal for external circuit has been explained exclusively. The present invention, however, is not limited to such a form. For example, the embodiments can also be applied to the vertical conduction terminals 106, which have been described referring to FIGS. 1 and 2, in a similar way. The vertical conduction terminals 106 have a sectional structure shown in FIG. 21 (refer to the relevant part in FIG. 2) for example in particular.

Figure 21:
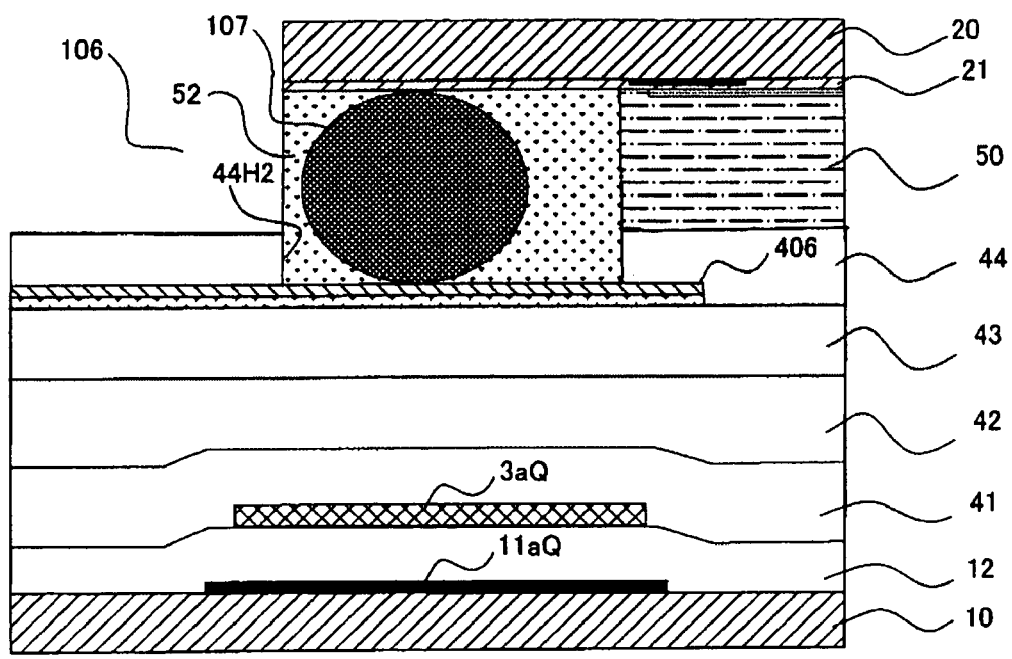
FIG. 21 is a sectional view in relation to a vertical conduction terminal and a structure around the vertical conduction terminal.

Referring to FIG. 21, each of vertical conduction terminals 106 can include a pad 406 and an opening 44H2 formed over the pad 406. A conductive particle 107 made by mixing silver pigment and the like into a paste medium is provided over the pad 406 to fill the opening 44H2. The conductive particle 107 is disposed so that one side thereof makes contact with the pad 406 and the other side thereof makes contact with the counter electrode 21 formed over the counter substrate 20. This allows the pad 406 and the counter electrode 21 to be invariably kept at the same potential, and especially a given constant potential and so on can be supplied from the pad 406 to the counter electrode 21. The conductive particle 107 is mixed into the sealing material 52 provided to join the TFT array substrate 10 and the counter substrate 20 (refer to FIGS. 1 and 2).

The vertical conduction terminals 106 have almost same structure as that of the connection terminals 102 for external circuit and so on as is cleat from comparison between FIGS. 8 and 21, and assumes the similar function to expose an electrode to outside of the electro-optical device so that signals and so on are supplied thereto. Accordingly, various structures described in the embodiments can also be applied to the vertical conduction terminals 106 basically, and if applied, almost same advantageous effects as those obtained for the connection terminals 102 for external circuit can be achieved.

Referring to FIG. 21, the dummy gate electrode 3aQ and the dummy scanning line 11aQ are formed as third dummy film in the present invention, but the dummy storage capacitor 70P and so on shown in FIG. 8 and so on are not formed. This is an example showing that all of the third dummy films in the invention formed in the image display area 10a are not necessarily formed. If the dummy storage capacitor 70P and so on do not exist, a step for the thickness thereof is caused. The step, however, is canceled by increasing the thickness of the interlayer insulating film that is the upper layer thereof, and implementing planarizing treatment for the film.

The pad 406 is connected as one of the connection terminals 102 for external circuit of the embodiments.

Figure 22:
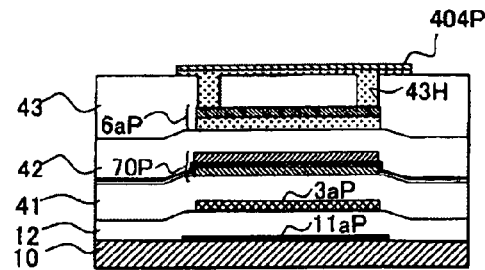
FIG. 22 is a sectional view of a manufacturing process explaining processes from the formation of the pad to the formation of the alignment film in the order of events, in relation to the features of FIG. 13.
Figure 22:
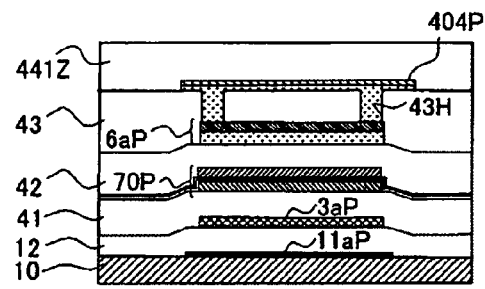
Figure 22:
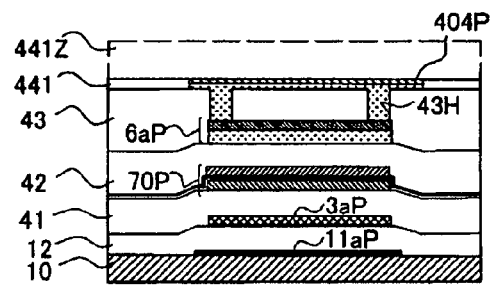
Figure 22:
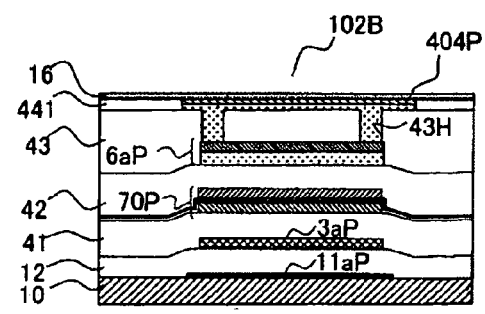

A method of manufacturing the electro-optical device according to the third embodiment will be described below referring to FIG. 22. FIG. 22 is a sectional view of a manufacturing process explaining processes from the formation of the pad 404P to the formation of the alignment film 16 in the order of events, in relation to the structure of FIG. 13. The manufacturing method of the dummy scanning line 11aP and so on is the same as that of the scanning line 11a and so on, the explanation thereof will be omitted. In FIG. 22, the manufacturing processes until the third interlayer insulating film 43 is formed have been completed.

Referring to FIG. 22, the pad 404P is formed over the third interlayer insulating film 43 in step (1). For the pad 404P, for example, first, a metal film such as an aluminum film is deposited with the thickness of about 100 to 500 nm by sputtering. Then, patterning treatment (photolithography and etching processes) is implemented for the metal film to provide a given pattern thereto. Next, a precursor film composed of nitride titanium is deposited with the thickness of about 100 to 500 nm by sputtering. Then, patterning treatment is implemented for the precursor film to provide the same given pattern as that of the metal film to the precursor film. The given pattern is determined so that the capacitance wiring 400, the third relay electrode 402, and the pad 404P are accordingly formed when viewing the third interlayer insulating film 43 from above (refer to FIGS. 1, 5, and 7). In this case, the patterning treatment is implemented so that the capacitance wiring 400 and so on and the pad 404P are electrically isolated from each other. There is no need to implement the patterning treatment separately for the metal film composed of aluminum and so on, and the precursor film composed of nitride titanium. The patterning treatment for the both films may be implemented at the same time.

Next, a precursor film 441Z of the fourth interlayer insulating film 441 is formed over the pad 404P in step 22 (2). Specifically, for example, the precursor film 441Z is formed by normal or vacuum pressure CVD employing a TEOS (tetra ethyl ortho silicate) gas, a TEB (tetra ethyl boatrate) gas, a TMOP (tetra methyl oxy phosrate) gas, or the like. The precursor film 441Z is formed of a film of silicate glass such as NSG (non-doped silicate glass), PSG (phosphosilicate glass), BSG (borosilicate glass), and BPSG (borophosphosilicate glass), a nitride silicon film, and an oxide silicon film for example. The thickness of the precursor film 441Z needs to exceed the thickness of the pad 404P at the very least. Specifically, the thickness is preferably about 1000 to 2000 nm.

Then, in step 22 (3), CMP treatment is implemented for the surface of the precursor film 441Z. The CMP treatment is a technique for planarizing a surface. In the CMP treatment, a surface of a treated substrate is polished utilizing combination of mechanical work and chemical work by bringing the surface of the treated substrate into contact with a surface of a polishing cloth (pad) with rotating both of the treated substrate and the polishing cloth, and supplying a polishing liquid (slurry) including a silica particle and the like to the contact part. In the present embodiment, the "treated substrate" corresponds to a feature having a structure shown in step (2) of FIG. 22.

In the embodiment especially, such CMP treatment is implemented until the surface of the pad 404P is exposed as shown in step (3) of FIG. 22. Namely, the pad 404P is utilized for detection of ending point of the CMP treatment. Specifically, a method can be adopted where a part corresponding to the formation area of the pad 404P is monitored with an appropriate imaging way and so on, while the CMP treatment is finished at the instant when the imaging way captures the surface of the pad 404P.

Another various methods are also available. In any case, the precursor film 441Z is polished to the extent that the fourth interlayer insulating film 441 becomes coplanar with the pad 404P by implementing the CMP treatment (refer to dashed line in the drawing). This enables a structure where the fourth interlayer insulating film 441 is left only at sides of the pad 404P to be easily manufactured.

In step 22 (4), a polyimide coating liquid of the alignment film 16 is applied on the fourth interlayer insulating film 441 and the pad 404P so as to be annealed, and then rubbing is implemented therefor in a given direction so that the alignment film 16 has a given pretilt angle, and thereby the alignment film 16 is formed. In the embodiment, the possibility that shavings of the alignment film 16 are generated when rubbing is implemented for the alignment film 16 is extremely reduced since concavity and convexity are not formed in the alignment film 16. Thus, in the electro-optical device manufactured through steps (1) to (4) of FIG. 22, the deterioration of image quality due to the shavings entering the image display area 10a is hardly caused such that extremely high quality images can be displayed.

In the above, the manufacturing method of the electro-optical device of the third embodiment shown in FIGS. 12 and 13, particularly that of the connection terminals 102B for external circuit has been described. Besides, the same method can also be applied to the electro-optical device and the connection terminal for external circuit according to another embodiments. For example, with regard to the electro-optical device and the connection terminals 102 for external circuit according to the first embodiment, steps (1) and (2) of FIG. 22 are equally applied thereto, and instead of step (3) of FIG. 22, the opening 44H is formed by implementing dry etching such as reactive ion etching and reactive ion beam etching and so on for the fourth interlayer insulating film 44 (although it is the precursor film 441Z in step (2), the fourth interlayer insulating film 44 corresponds to the precursor film 441Z in the electro-optical device of the first embodiment directly). On this occasion, wet etching is implemented for adjusting the opening shape of the opening 44H as described above. Then, the same CMP treatment as above is implemented for the fourth interlayer insulating film 44 where the opening 44H has been formed, and thereafter the alignment film 16 is formed. As a result, the electro-optical device and the connection terminals 102 for external circuit of the first embodiment are manufactured.

Figure 23:
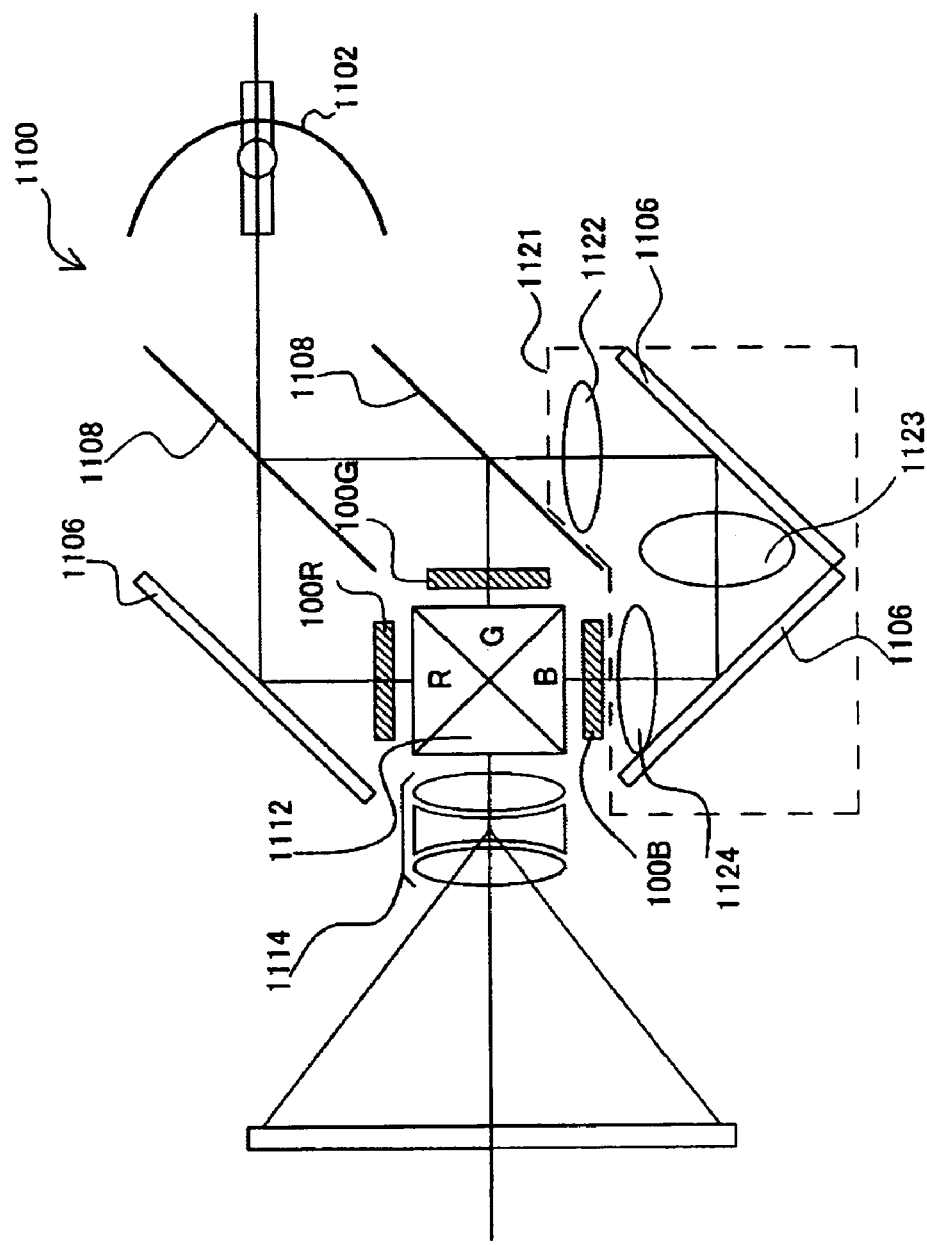
FIG. 23 is a graphical sectional view showing a color liquid crystal projector as one example of a projection color display that is an embodiment of an electronic apparatus of the invention.

With regard to an embodiment of a projection color display that is one example of electronic apparatuses using the electro-optical device described above in detail as a light valve, the whole structure thereof, particularly optical structure thereof will be described. FIG. 23 is a sectional view graphically showing a projection color display.

Referring to FIG. 23, in a liquid crystal projector 1100 that is one example of a projection color display of the embodiment, three liquid crystal modules including a liquid crystal device where a driver is mounted on a TFT array substrate are provided, and each of modulus is used as light valves 100R, 100G, and 100B for RGB display. In the liquid crystal projector 1100, when projected light is emitted from a lamp unit 1102 that is a white light source, such as a metal halide lamp, the projected light is divided into light components R, G and B corresponding to three primary colors of RGB by three mirrors 1106 and two dichroic mirrors 1108 so as to be lead to each of light valves 100R, 100G, and 100B corresponding to each color. Particularly, the light B is lead through a relay lens system 1121 including an entrance lens 1122, a relay lens 1123, and an end lens 1124 in order to avoid optical loss due to the long optical path. The light components corresponding to three primary colors that each have been modulated by the light valves 100R, 100G, and 100B are combined again by a dichroic prism 1112 so as to be projected to a screen 1120 through a projection lens 1114 as a color image. Furthermore, the above electro-optical device can also be applied to electro-optical devices such as an electrophoresis apparatus like an electronic paper and an EL (Electro-Luminescence) display, other than a liquid crystal device.

It should be understood that the present invention is not limited to the above embodiments, but that various modifications can be made without departing from the scope and spirit of the invention that are read out through the whole of claims and specification. An electro-optical device, a method of manufacturing the same, and an electronic apparatus with such a modification are also included in technical scope of the invention.

Further, while this invention has been described in conjunction with the specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An electro-optical device, comprising:
    a connection terminal unit, including:
        a first insulating film formed over a substrate and planarized;
        a first conductive film formed over the first insulating film and that transmits at least a signal from an external circuit;
        a second insulating film formed over the first insulating film and planarized; and
        an opening formed in an area of the second insulating film that corresponds to the first conductive film and that extends to the first conductive film;
    a switching element disposed in an image display area;
    a data line electrically coupled to the switching element;
    a pixel electrode electrically coupled to the switching element;
    a storage capacitor including a pixel-potential-side capacitor electrode electrically coupled to pixel potential of the pixel electrode, and a fixed-potential-side capacitor electrode opposed to the pixel-potential-side capacitor electrode through an insulating film; and
    a capacitance line formed above the data line and electrically coupled to the fixed-potential-side capacitor electrode, the capacitance line being formed over the first insulating film, and the first conductive film being formed of the same film as that of the capacitance line.

2. The electro-optical device according to claim 1, a conductive film formed of the same film as that of any of wiring and an electrode that is deposited in an image display area, being formed beneath the first insulating film that corresponds to the connection terminal unit.

3. The electro-optical device according to claim 1, the first conductive film forming a surface of the connection terminal unit coupled to a substrate that connects to the external circuit.

4. The electro-optical device according to claim 1, a top surface of the second insulating film being at substantially a same level as a top surface of the first conductive film.

5. The electro-optical device according to claim 1, further comprising:
    a second conductive film electrically coupled to the first conducive film through the opening in the second insulating film.

6. The electro-optical device according to claim 5, the second conductive film forming a surface of the connection terminal unit coupled to a substrate that connects to the external circuit.

7. The electro-optical device according to claim 5,
    the opening in the second insulating film including a plurality of first contact holes; and
    the first and second conductive films being electrically coupled to each other through the first contact holes.

8. The electro-optical device according to claim 7, the plurality of first contact holes being formed in a manner of being dotted at least over the first conductive film.

9. The electro-optical device according to claim 1, the first conductive film being electrically coupled to wiring that is electrically coupled to an internal circuit.

10. The electro-optical device according to claim 9, the wiring electrically coupled to the internal circuit being formed over the first insulating film and being formed of a same film as that of the first conductive film.

11. The electro-optical device according to claim 9, the wiring electrically coupled to the internal circuit being formed over a third insulating film that is under the first insulating film, and being electrically coupled to the first conductive film through a second contact hole.

12. The electro-optical device according to claim 11, the second contact hole being formed under a periphery of the first conductive film.

13. The electro-optical device according to claim 12, the second contact hole being positioned at an area overlapping with the second insulating film.

14. The electro-optical device according to claim 11,
    the second contact hole including a plurality of second contact holes; and the plurality of second contact holes being formed in a manner of being dotted under the first conductive film.

15. The electro-optical device according to claim 11, the data line being formed over the third insulating film; and
the wiring electrically coupled to the internal circuit being formed of a same film as that of the data line.

16. The electro-optical device according to claim 1, further comprising:
a counter substrate opposed to the substrate and including a counter electrode; and
a pad formed of a same film as that of the first conductive film, the pad and the counter electrode being electrically coupled to each other through a conductive terminal.

17. An electronic apparatus, comprising the electro-optical device according to claim 1.

18. An electro-optical device, comprising:
a connection terminal unit, including:
a first insulating film formed over a substrate;
a first conductive film formed over the first insulating film and that transmits a signal from an external circuit;
a second insulating film formed over the first insulating film and planarized; and
an opening formed in an area of the second insulating film that corresponds to the first conductive film and extends to the first conductive film; and
wiring formed over a third insulating film that is under the first insulating film and electrically coupled to the first conductive film through a contact hole, and an internal circuit;
a switching element disposed in an image display area;
a data line electrically coupled to the switching element;
a pixel electrode electrically coupled to the switching element;
a storage capacitor including a pixel-potential-side capacitor electrode electrically coupled to pixel potential of the pixel electrode, and a fixed-potential-side capacitor electrode opposed to the pixel-potential-side capacitor electrode through an insulating film; and
a capacitance line formed above the data line and electrically coupled to the fixed-potential-side capacitor electrode, the capacitance line being formed over the first insulating film, and the first conductive film being formed of the same film as that of the capacitance line.

19. The electro-optical device according to claim 18, a top surface of the second insulating film being at substantially a same level as a top surface of the first conductive film.

20. An electro-optical device, comprising:
a switching element disposed in an image display area;
a data line formed over a first insulating film and electrically coupled to the switching element;
a pixel electrode electrically coupled to the switching element;
a storage capacitor including a pixel-potential-side capacitor electrode electrically coupled to pixel potential of the pixel electrode, and a fixed-potential-side capacitor electrode opposed to the pixel-potential-side capacitor electrode through an insulating film;
a capacitance line formed over a second insulating film that is over the data line and electrically coupled to the fixed-potential-side capacitor electrode;
a third insulating film disposed over the capacitance line;
a connection terminal unit, including;
a first conductive film formed of a same film as that of the capacitance line over the second insulating film and transmitting a signal from an external circuit; and
an opening formed in an area of the third insulating film that corresponds to the first conductive film and extends to the first conductive film; and
wiring formed of a same film as that of the data line over the first insulating film and electrically coupled to the first conductive film through a contact hole, and an internal circuit.

21. A method of manufacturing an electro-optical device, comprising:
forming a first insulating film over a substrate and planarizing a surface of the first insulating film;
forming a first conductive film formed over the first insulating film and transmitting a signal from an external circuit;
forming a second insulating film over the first insulating film and the first conductive film and planarizing the second insulating film;
removing an area of the second insulating film that corresponds to the first conductive film to uncover the first conductive film so as to form a connection terminal unit;
forming a switching element in an image display area;
forming a data line to electrically couple to the switching element;
forming a pixel electrode to electrically couple to the switching element;
forming a storage capacitor including a pixel-potential-side capacitor electrode electrically coupled to pixel potential of the pixel electrode, and a fixed-potential-side capacitor electrode opposed to the pixel-potential-side capacitor electrode through an insulating film; and
forming a capacitance line above the data line and electrically coupled to the fixed-potential-side capacitor electrode, the capacitance line being formed over the first insulating film, and the first conductive film being formed of the same film as that of the capacitance line.

22. The method of manufacturing an electro-optical device according to claim 21,
the first conductive film being formed simultaneously with a capacitance line formed in an image display area; and
the second conductive film being formed simultaneously with a data line formed in the image display area.

* * * * *